United States Patent
Kuwata et al.

(10) Patent No.: US 7,483,168 B2
(45) Date of Patent: Jan. 27, 2009

(54) APPARATUS, METHOD, SIGNAL AND COMPUTER PROGRAM PRODUCT CONFIGURED TO PROVIDE OUTPUT IMAGE ADJUSTMENT OF AN IMAGE FILE

(75) Inventors: Naoki Kuwata, Nagano-ken (JP); Yoshihiro Nakami, Nagano-ken (JP); Isao Edatsune, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 739 days.

(21) Appl. No.: 09/941,711

(22) Filed: Aug. 30, 2001

(65) Prior Publication Data
US 2002/0030833 A1 Mar. 14, 2002

(30) Foreign Application Priority Data

| Sep. 1, 2000 | (JP) | 2000-265794 |
| Feb. 9, 2001 | (JP) | 2001-034518 |
| Mar. 15, 2001 | (JP) | 2001-074696 |
| Jul. 18, 2001 | (JP) | 2001-217878 |

(51) Int. Cl.
*G06K 9/40* (2006.01)

(52) U.S. Cl. ............... 358/1.9; 358/518; 382/254; 382/261

(58) Field of Classification Search ............ 358/1.9, 358/1.6, 1.16, 2.1, 3.23, 403, 426.02, 501, 358/518, 1.13, 1.15, 523; 382/167, 254
See application file for complete search history.

(56) References Cited

U.S. PATENT DOCUMENTS

| 5,105,266 A | * | 4/1992 | Telle ............... 358/518 |
| 6,011,547 A | * | 1/2000 | Shiota et al. ............... 382/254 |
| 6,273,535 B1 | | 8/2001 | Inoue et al. |
| 6,281,992 B1 | * | 8/2001 | Kondo ............... 358/501 |
| 6,523,046 B2 | * | 2/2003 | Liu et al. ............... 707/104.1 |
| 6,597,468 B1 | | 7/2003 | Inuiya |

FOREIGN PATENT DOCUMENTS

| GB | 2 328 104 | 2/1999 |
| JP | 06-008537 | 1/1994 |
| JP | 09-219817 | 8/1997 |

(Continued)

OTHER PUBLICATIONS

Abstract of Japanese Patent Pub. No. 06-008537, Pub. Date: Jan. 18, 1994, Patent Abstracts of Japan.

(Continued)

*Primary Examiner*—Edward L. Coles
*Assistant Examiner*—James A Thompson
(74) *Attorney, Agent, or Firm*—Martine Penilla & Gencarella, LLP

(57) ABSTRACT

An apparatus, method, signal and computer program product is provided to generate an image file that can correctly reproduce image data at a predetermined output device. The image file includes an image data storage area that stores image data, and a control information storage area stores output control information. The image data is stored in JPEG format for example, and output control information is stored in TIFF format. The output device control information is information set so as to be able to obtain an optimal image output results according to a paired-combination of the input device and output device, taking into consideration their respective image processing characteristics.

65 Claims, 10 Drawing Sheets

FOREIGN PATENT DOCUMENTS

| | | |
|---|---|---|
| JP | 09-238265 | 9/1997 |
| JP | 10-191246 | 7/1998 |
| JP | 10-226139 | 8/1998 |
| JP | 11-041480 | 2/1999 |
| JP | 11-041622 | 2/1999 |
| JP | 11-088672 | 3/1999 |
| JP | 11-127415 | 5/1999 |
| JP | 11-146182 | 5/1999 |
| JP | 11-327605 | 11/1999 |
| JP | 11-331596 | 11/1999 |
| JP | 2000-013718 | 1/2000 |
| JP | 2000-137806 | 5/2000 |
| JP | 2000-278598 | 10/2000 |
| JP | 2001-147481 | 5/2001 |
| WO | WO 92/05652 | 4/1992 |

OTHER PUBLICATIONS

Abstract of Japanese Patent Pub. No. 09-219817, Pub. Date: Aug. 19, 1997, Patent Abstracts of Japan.

Abstract of Japanese Patent Pub. No. 10-191246, Pub. Date: Jul. 21, 1998, Patent Abstracts of Japan.

Abstract of Japanese Patent Pub. No. 11-088672, Pub. Date: Mar. 3, 1999, Patent Abstracts of Japan.

Abstract of Japanese Patent Pub. No. 11-127415, Pub. Date: May 11, 1999, Patent Abstracts of Japan.

Abstract of Japanese Patent Pub. No. 11-331596, Pub. Date: Nov. 30, 1999, Patent Abstracts of Japan.

Abstract of Japanese Patent Pub. No. 2000-013718, Pub. Date: Jan. 14, 2000, Patent Abstracts of Japan.

Abstract of Japanese Patent Pub. No. 2000-137806, Pub. Date: May 16, 2000, Patent Abstracts of Japan.

Abstract of Japanese Patent Pub. No. 2001-147481, Pub. Date: May 29, 2001, Patent Abstracts of Japan.

Abstract of Japanese Patent Publication 11-041622, Pub. Date: Feb. 12, 1999, Patent Abstracts of Japan.

Abstract of Japanese Patent Publication 11-327605, Pub. Date: Nov. 26, 1999, Patent Abstracts of Japan.

Abstract of Japanese Patent Publication 2000-278598, Pub. Date: Oct. 6, 2000, Patent Abstracts of Japan.

Abstract of Japanese Patent Publication No. 09-238265, Pub. Date: Sep. 9, 1997, Patent Abstracts of Japan.

Abstract of Japanese Patent Publication 11-146182, Pub. Date: May 28, 1999, Patent Abstracts of Japan.

Abstract of Japanese Patent Publication 11-041480, Pub. Date: Feb. 12, 1999, Patent Abstracts of Japan.

* cited by examiner

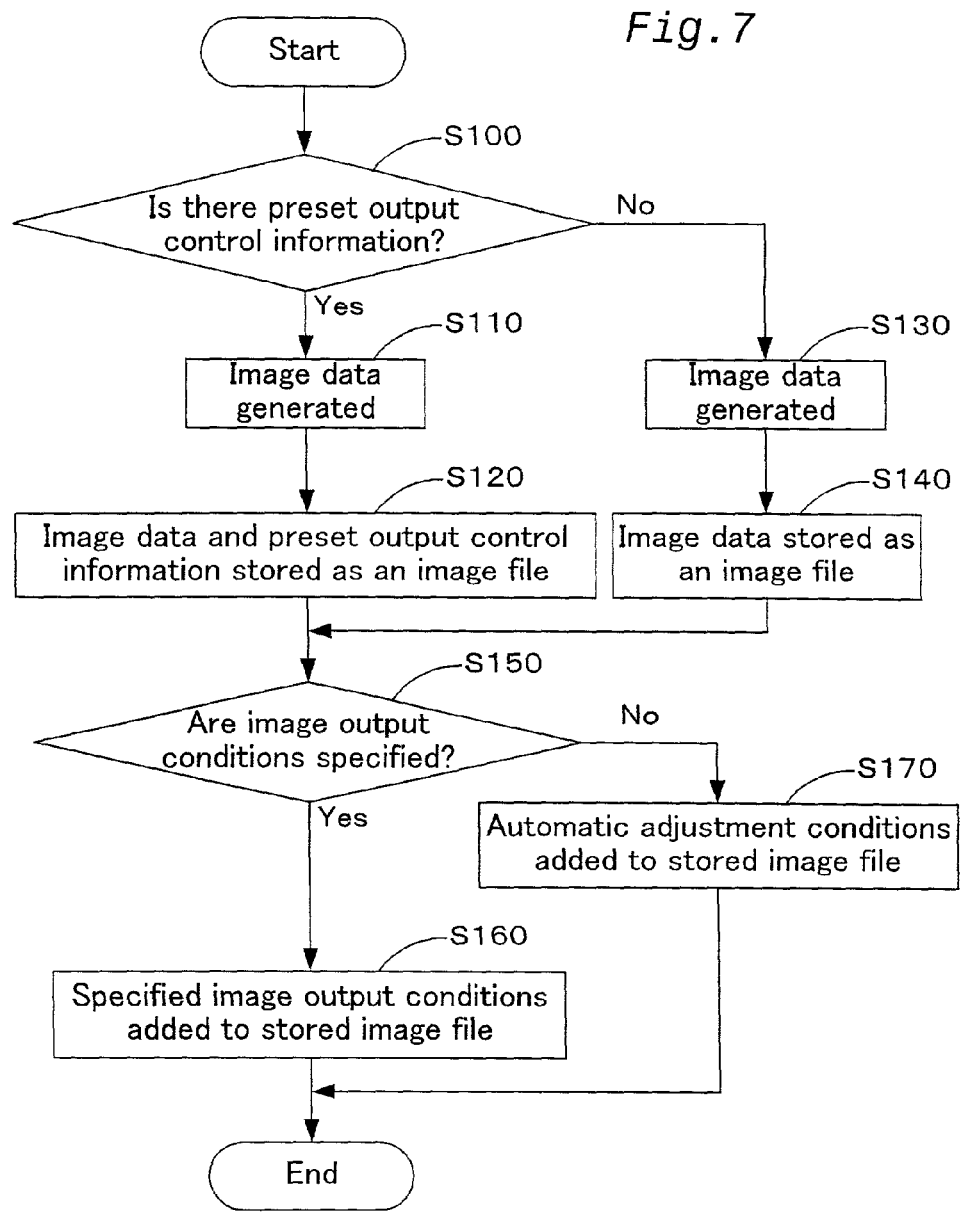

Fig.8

| Control Parameters | Specified Value |
|---|---|
| Gamma value | 2. 2 |
| Target color space | NTSC |
| sRGB negative value processing | 1 (valid) |
| Shadow | 5 |
| Highlight | 2 |
| Contrast | 0 |
| Brightness | 4 |
| RGB color balance | R0/G-1/B2 |
| Saturation | 0 |
| Sharpness | Threshold value 2 Applied volume 3 |
| Stored color correction | Green 0, 0, 0 (unspecified), Light blue 0, 0, 0 (unspecified) Flesh 0, 0, 0 (unspecified), Red 0, 0, 0 (unspecified) |
| Automatic adjustment | 5 |
| Paper | 3 (photographic paper) |
| Resolution | 4 (photograph) |
| Bi-directional printing | 1 (on) |

$$\begin{pmatrix} R \\ G \\ B \end{pmatrix} = S \begin{pmatrix} Y \\ Cb - 128 \\ Cr - 128 \end{pmatrix}$$

$$S = \begin{pmatrix} 1 & 0 & 1.40200 \\ 1 & -0.34414 & -0.71414 \\ 1 & 1.77200 & 0 \end{pmatrix}$$

Figure 12

$$\begin{pmatrix} X \\ Y \\ Z \end{pmatrix} = M \begin{pmatrix} Rt' \\ Gt' \\ Bt' \end{pmatrix} \qquad M = \begin{pmatrix} 0.6067 & 0.1736 & 0.2001 \\ 0.2988 & 0.5868 & 0.1144 \\ 0 & 0.0661 & 1.1150 \end{pmatrix}$$

$Rt, Gt, Bt \geq 0$ $$Rt' = \left(\frac{Rt}{255}\right)^{\gamma} \qquad Gt' = \left(\frac{Gt}{255}\right)^{\gamma} \qquad Bt' = \left(\frac{Bt}{255}\right)^{\gamma}$$

$Rt, Gt, Bt < 0$ $$Rt' = -\left(\frac{-Rt}{255}\right)^{\gamma} \qquad Gt' = -\left(\frac{-Gt}{255}\right)^{\gamma} \qquad Bt' = -\left(\frac{-Bt}{255}\right)^{\gamma}$$

Figure 13

$$\begin{pmatrix} Re \\ Ge \\ Be \end{pmatrix} = N^{-1} \begin{pmatrix} X \\ Y \\ Z \end{pmatrix}$$

$$N^{-1} = \begin{pmatrix} 3.30572 & -1.77561 & 0.73649 \\ -1.04911 & 2.1694 & -1.4797 \\ 0.0658289 & -0.241078 & 1.24898 \end{pmatrix}$$

$$Re' = \left(\frac{Re}{255}\right)^{1/\gamma} \qquad G' = \left(\frac{Ge}{255}\right)^{1/\gamma} \qquad B' = \left(\frac{Be}{255}\right)^{1/\gamma}$$

Figure 14

APPARATUS, METHOD, SIGNAL AND COMPUTER PROGRAM PRODUCT CONFIGURED TO PROVIDE OUTPUT IMAGE ADJUSTMENT OF AN IMAGE FILE

BACKGROUND OF THE INVENTION

1. Field of the Invention

The present invention relates to image files and image file output technology. More particularly, the present invention relates to apparatuses, such as digital still cameras (DSC), digital video cameras (DVC), scanners, which capture and store images for subsequent visual presentation to an end user via an output device, such as a printer or display. Thus, the invention also relates to signal processing hardware and software components, including propagated data signals, and presentation devices, such as printers.

2. Discussion of the Background

In contrast to a normal camera, for which the typical captured image output format is a recording paper, images shot by DSCs or DVCs can be used as an image file. Because these image files contain digital data, handling of the image files is easy. Thus, it is possible to output the image data in a variety of output formats that can be used for display by a variety of file output devices, such as CRTs, LCDs, printers, projectors, and television receivers.

However, as recognized by the present inventors, each of these output devices has different image output characteristics. This, in turn, means that an image file generated by a particular DSC will appear different, depending on the selected output device. Even output devices of the same class, e.g., DSC, will have different output characteristics, and so there is some variability on print result for an image taken by a DSC, depending on the selected output device. For example, when an image file is presented for display on a CRT, or on processing standards (such as sRGB color space) developed for a CRT, a problem will arise when this image file is output by a printer. The problem is one of suboptimal matching of printer image output characteristics for the processing performed on the image generated by the DSC. This problem is not unique to DSCs, but is also a problem with other image file generating devices such as DVCs as well.

Despite the fact that image files can have their image quality adjusted (image quality adjustment) after shooting, there is the problem that the preferences of the image file user can not be reflected in the image output. Some image file modification software or the like may be used to provide suitable output results at a desired output device or to obtain output results that suit the photographer's or editor's own preferences by performing image quality adjustments on image files. It would be convenient if suitable output results could be obtained without performing this kind of image quality adjustment. A limitation with the generation of image files in this way is that when a photographer prepares to take a photo (create an image), the photographer creates a mental image and then makes the necessary camera adjustments to take the photo. However, the results as printed on a printer or other output device may not be matched with what the photographer actually intended to capture.

For example, the photographer may select a Marco mode to define a sharpness before taking a picture of a flower, for example. Alternatively, the user may select a portrait mode to blur the background so as to capture a child's expression more clearly, or increase shutter speed for example. In order for the photographer to produce the images that the photographer intended to, the image data must be transferred from the DSC in a way so that the information is not lost or otherwise converted before being output on a desired output device.

However, when looking at the image capturing and reproduction process from the output device (e.g., printer's) side, there is no process or mechanism that allows for the data to be transferred and processed in a way to ensure that the image data has not been altered, or at a minimum uncompromised, before provided to the printer. As a result, printers are inherently limited in being able to ensure that images produced by the printer are faithful to the image that the photographer was seeking to take. On the other hand, DSCs are inherently limited in their ability to control downstream processing so as to ensure the image will be faithfully reproduced.

As recognized by the present inventors, without being able to optimally match a DSC (or other imaging device) with a printer (or other output device for presenting images from image files), there is no guarantee that the printer will faithfully produce an output image, consistent with the image sought by the photographer.

This variability in operation characteristics between imaging devices and output devices gives rise to a marketing difficulty for imaging device vendors, as well as output device vendors. In a commercial sales setting, samples of the various DSCs offered for sale are made available to the consumers, although there is usually only one printer available for printing the results. In this situation, there is a general lack of consistency in a how a printed output from a particular DSC will be viewed, since different printers with different characteristics will be used for printing the image. Therefore, one particular DSC may give a potential consumer one impression when viewed in the store and a different impression when used on the consumer's home computer. This lack of consistency and uniformity in the commercial market, makes it difficult for particular DSC manufacturers, particularly ones that do not have a large market share to be able to participate on an equal footing with other DSC manufacturers, who may be able to influence merchants to use a certain type of printer to be used with the DSC demonstration models. On the other hand, it would be desirable if a mechanism were available for optimally matching DSCs to the particular printer used to output the images therefrom since this would allow consumers to differentiate DSCs on operational characteristics other than number of pixels.

Various conventional systems and methods have been employed to address this inconsistency between DSCs and printers. For example, U.S. Pat. No. 6,011,547 describes a method and apparatus for reproducing an image from data obtained by a DSC. The DSC includes a recording information adding unit that is able to add recording information representing a recording condition. This information is specific to the DSC and contains information which varies at each recording. The data file that is output includes the image data as well as this recording information. However, limitations with this approach are that the recording information that is added, does not include parameters that are unique to the recording device. The output of the digital camera does not include a data file from the DSC with information about that recording device. Furthermore, it is presumed that the various printers are able to print images equally well, thus not needing to include information about the printer when the image is captured and transmitted by the DSCs for intermediate processing and subsequent production of a rendering of the image on the printer.

Japanese publication JLOP 10-226139 describes a system and apparatus for capturing a digital photograph and including, with the photograph, selected information about what type of processing can be performed downstream, at a printer.

Moreover, JLOP 10-226139 describes a digital picture input device that is able to hold printer control information. The printer control information includes a modality of the printer, and a combination of parameters used in a printing control processing to be performed by the printer Such as printing quality, image processing printing speed, masking and the like. The digital picture input device is able to specify which processing is to be performed in the printer when the image data is sent to the printer. The printing control information is useful at the DSC, when the digital picture input device is set to perform special image processing. When the special image processing is performed, compulsory printing control processing information is sent to the printer that will be suitable for the image processing performed by the specific printer in association with the picture input device. This process is called "recommendation printing control processing" that is performed by the digital picture input device.

A limitation with the approach provided in JLOP 10-226139 is that it presupposes a particular printer with a particular printer control process to be used. The information output from the picture input device essentially controls the printing operation just as if an operator could do, if the data was to be input at the printer itself. It is presently recognized that a limitation with this approach is that a one-to-one relationship exists between the printer that is to be printed and the DSC. Furthermore, a significant amount of data would be needed to be sent with each image file in order to control the printer modality and all of the printing parameters associated with the image processing to be performed at the printer. Since image file space is of key commercial, the present inventors have recognized that shorter files would be more optimum, especially files that provide parameters that merely adjust processes performed at the printer. In this Way, the DSC manufacturer, can identify optimum parameter settings that reflect a combination of both the DSCs characteristics, but also the printer's characteristics.

SUMMARY OF THE INVENTION

The present invention was created to solve the aforementioned problems and limitations with conventional devices, and to generate an image file, as well as a signal that contains the image file, that can optimally reproduce an image at an output device and to obtain output results that reflect the intention of the photographer who generated the image data at the input device.

A first embodiment of the present invention provides an image data generating apparatus to solve the aforementioned problems. The image data generating apparatus of the first embodiment of the present invention is characterized in that it comprises an image data generating mechanism that generates image data, an output process control information obtaining mechanism that obtains output process control information determined based on a combination of the image data generating apparatus and an output apparatus, with the output process control information being information that controls the output process for an output apparatus that outputs the image data, and an image file generating mechanism that combines and matches the generated image data and the obtained output process control information and generates an image file containing the same. With the image data generating apparatus of the first embodiment of the present invention, it is possible to generate an image file that correlates (which should not be construed in a strict mathematical sense, such as "autocorrelation") output process control information and image data determined based on a combination of the image data generating apparatus that generates image files and the output apparatus and that stores the image data and output process control information. The output process control information is determined for each combination of image data generating apparatus and output apparatus, so it is possible to make suitable output results of image data at the output apparatus.

For the image data generating apparatus of the first embodiment of the present invention, the output process control information can include information for controlling the image data reproduction characteristics at output device. In this case, it is possible to control reproduction characteristics according to the combination of the image data generating apparatus and the output apparatus. The output process control information can include gamma correction information for example. In this case, it is possible to give suitable gamma correction information to the output device according to the combination of characteristics of the image data generating apparatus and the output apparatus. Furthermore in addition to the output process control information, it is possible to store in the image file additional information that is correlated to the image data, the additional information including at least one item from among color space information, contrast information, color balance information, sharpness information, color correction information, shadow point information, highlight point information, brightness correction information, and highlight color information. In this case, it is possible to give each type of information to the output apparatus according to the combination of the image data generating apparatus and the output apparatus.

The image data generating apparatus of the first embodiment of the present invention can further include an output process control information generating mechanism that generates the output process control information, and the output process control information obtaining mechanism can obtain the generated output process control information. In this case, it is possible to suitably generate output process control information.

The image data generating apparatus of the first embodiment of the present invention can further include an output process control information storing device that stores the output process control information, and the output process control information obtaining mechanism can obtain the stored output process control information.

The second embodiment of the present invention provides an image data generating apparatus. The image data generating apparatus of the second embodiment of the present invention includes an image data generating mechanism that generates image data based on a subject, a first image obtaining mechanism that obtains first information for faithfully reproducing the color of the subject, the information reflecting the reproduction characteristics of the output device that outputs the generated image data, a second image obtaining mechanism that obtains second information for specifying any image quality adjustment process in relation to the image data at the output device, the information reflecting the reproduction characteristics of the output device, and an image file generating mechanism that generates an image file that stores the generated image data and the obtained first and second information.

With the image data generating apparatus of the second embodiment of the present invention, it is possible to faithfully reproduce the color of the subject taking into consideration the reproduction characteristics of the output apparatus that outputs the generated image data, and it is possible to generate an image file that can specify any image adjustment process for image data at the output apparatus, taking into consideration the reproduction characteristics of the output apparatus. Therefore, it is possible to obtain the desired image output results when outputting an image file.

For the image data generating apparatus of the second embodiment of the present invention, the first information can contain at least one information among gamma correction information, color space information, and negative image data value processing information.

For the image data generating apparatus of the second embodiment of the present invention, the second information is information that reflects the color space conversion characteristics when converting image data color space to printing color space. In this case, it is possible to attempt to match the image data color space and printing color space. Also, the second information can include at least one information from among Shadow point information, highlight point information, contrast information, brightness correction information, color balance information, saturation information, sharpness information, and stored color correction information. By including the concerned information, it is possible to specify any image adjustment process for image data at the output apparatus taking into consideration the reproduction characteristics of the output apparatus.

For the image data generating apparatus of the first or second embodiment of the present invention, the image data generating apparatus can be a digital still camera. In this case, it is possible to generate output process control information according to the combination of the digital still camera and the output apparatus.

The third embodiment of the present invention is directed to a digital still camera. The digital still camera of the third embodiment of the present invention is characterized in that it includes an image data generating mechanism that generates image data, an output process control information obtaining mechanism that obtains output process control information determined based on a combination of the image file generating mechanism and an output apparatus, with the information being information that controls the output process for an output apparatus that outputs the image data, and an image file generating mechanism that correlates the generated image data and the obtained output process control information and generates an image file to store the scene.

With the digital still camera of the third embodiment of the present invention, it is possible to obtain the same effects as the image data generating apparatus of the first embodiment of the present invention. Also, the digital still camera of the third embodiment of the present invention can realize several specific varieties as can the image data generating apparatus of the first embodiment of the present invention.

The fourth embodiment of the present invention provides a computer program product that generates an image file and an associated signal that is an of the image file that controls the output process for the output apparatus that outputs image data. The program of the fourth embodiment of the present invention is characterized in that the program uses a computer to realize an image data generating function, a function that obtains output process control information determined based on a combination of the output apparatus and an image data generating apparatus, the information controlling the output process for the output device, and a function that generates an image file that correlates the generated image data and the obtained output process control information and stores the same.

With the program of the fourth embodiment of the present invention, it is possible to obtain the scene effects as the image data generating apparatus of the first embodiment of the present invention. Also, the program of the fourth embodiment of the present invention can be realized in a variety of embodiments as can the image data generating apparatus of the first embodiment of the present invention.

The fifth embodiment of the present invention provides a program that generates an image file that controls the image process function for the output apparatus that outputs image data that was generated after capturing an image of a subject. The program of the fifth embodiment of the present invention uses a computer to realize a function for obtaining first information for faithfully reproducing the color of the subject, the information reflecting the reproduction characteristics of the output device, a function for obtaining second information for specifying any image quality adjustment process in relation to the image data at the output device, the information reflecting the reproduction characteristics of the output device, and a function that generates an image file that stores the obtained first and second information and identification information for identifying the output apparatus.

With the computer program product of the fifth embodiment of the present invention, it is possible to obtain the same effect as with the image data generating apparatus of the second embodiment of the present invention. Also, the program of the fifth embodiment of the present invention can realize a variety of embodiments as does the image data generating apparatus of the second embodiment of the present invention.

The sixth embodiment of the present invention provides an image processing device that executes image processing of image data using image the data and a process control data. The image processing device of the sixth embodiment of the present invention is characterized in that it includes a data retrieval mechanism that retrieves the image data and the process control data that include image process control information determined based on a combination of the output apparatus and image data generating apparatus, and an image processor that performs image processing of the image data based on image process control information contained in the retrieved process control data.

The image processing device of the sixth embodiment of the present invention can further include an image data output mechanism that outputs image data which has undergone the image processing.

The seventh embodiment of the present invention provides an output apparatus that outputs image data using image data, first information for faithfully reproducing the color of a subject considering the reproduction characteristics of the output apparatus, and second information for specifying any reproduction process on the image data at the output apparatus considering the reproduction characteristics of the output apparatus. The output apparatus of the seventh embodiment of the present invention is characterized in that it includes a data retrieval mechanism that retrieves the image data, the first information and the second information, a first reproduction process mechanism that executes reproduction processing on the image data to faithfully reproduce the color of the subject based on the first information, a second reproduction process mechanism that executes any reproduction process specified for the image data based on the second information, and an image data output mechanism that outputs image data which has undergone each of the reproduction processes.

With the seventh embodiment of the present invention, it is possible to execute reproduction processing on image data so as to faithfully reproduce the color of the subject based on the first information, and to execute any reproduction process specified on the image data based on the second information, and to obtain the desired image output results that were anticipated when generating the image file.

The eighth embodiment of the present invention provides an image output system for outputting image data using image files. The image output system of the eighth embodiment of the present invention is characterized in that it includes an image data generating mechanism that generates image data, an image process control information obtaining mechanism that obtains image process control information determined based on a combination of the output device and the image data generating device, the information controlling the image process at the output device that outputs the image data, an image data generating apparatus includes an image file generating mechanism that generates image files that correlate the generated image data and the obtained image process control information and stores the scene, an image file fetching mechanism that fetches image files generated by the image data generating apparatus, an image processor that executes image processing of the image data based on image process control information included in the fetched image file, and an image processing device includes an output mechanism that outputs image data which has undergone the image processing.

The eighth embodiment of the present invention provides an image output system for outputting image data using an image file. The image output system of the ninth embodiment of the present invention is characterized in that it includes (1) an image data generating device having:

an image data generating mechanism that generates image data based on a subject, a first fetching mechanism that fetches first information for faithfully reproducing the color of a subject, the information reflecting the reproduction characteristics of the output device that outputs image data, a second fetching mechanism that fetches second information for specifying any image quality adjustment processes for the image data at the output device, the information reflecting the reproduction characteristics of the output device, and an image file generating mechanism that generates image files that store the generated image data, and the fetched first and second information, and an image processing device including:

an image file fetching mechanism that fetches the image files, a first reproduction processing mechanism that executes reproduction processing on the image data to faithfully reproduce the color of the subject based on the first information, a second reproduction processing mechanism that executes any reproduction process specified for the image data based on the second information, and an image data output mechanism that outputs image data which has undergone each of the reproduction processes.

With the image output system of the ninth embodiment of the present invention, it is possible to use an image file having first information for faithfully reproducing the color of the subject taking into consideration the reproduction characteristics of the output device, and second information for specifying any color reproduction process for the image data at an output device taking into consideration the reproduction characteristics of the output device, and to realize an image output process that takes into consideration the color reproduction characteristics of the output device.

DETAILED DESCRIPTION OF THE FIGURES

FIG. 7 is a flow chart that shows the image processing flow at a digital still camera according to a second working example.

FIG. 8 is a table that shows an example of output control information CI parameters and parameter values set at the digital still camera for the second working example.

FIGS. 12 through 14 describe several signal processing expressions performed according to the present invention.

DETAILED DESCRIPTION OF THE INVENTION

Now, turning to the figures a description will be provided in the following sequence of several working examples of an image data output system that generates and processes image files according to the present invention.

Figure 1:
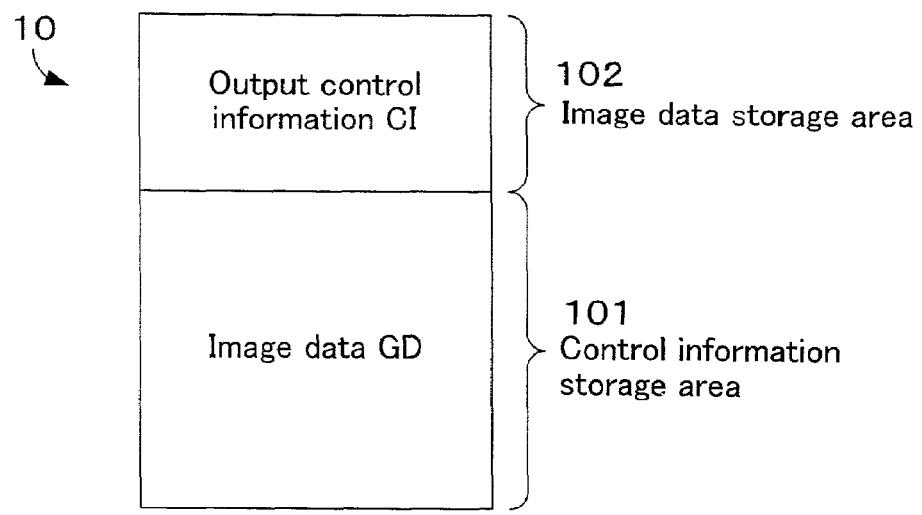
FIG. 1 is an explanatory diagram that conceptually shows the internal structure of an image file of a first working example according to the Present invention.

A. Structure of an Image File as a First Working Example
B. Structure of an Image Data Output System That Can Use Image Files
C. Image Processing by a Digital Still Camera as a Second Working Example
D. Image Processing by a Printer as a Third Working Example
E. Image Processing by a Printer as a Fourth Working Example
F. Other Working Examples A. Structure of an Image File as a First Working Example FIG. 1 is an explanatory diagram that conceptually shows the internal structure of an image file of the first working example. Image file GF (10) includes image data storage area 101 that stores image data GD and control information storage area 102 that stores output control information CI. Image data GD can be stored in JPEG format, for example, and output control information CI can be stored in TIFF format. The terms "file structure," "data structure," and "storage area" in this working example mean a file or data field configured to hold a digital representation of an image when a file or data, etc. is stored within a certain storage range of a storage device.

Output control information CI is information that specifies the image output conditions and image output status for an output device so as to be able to obtain the optimum image output results according to a combination of the input device, such as a DSC, and output device, such as a printer. Specifically, it is information for controlling image processing at the output device and perhaps at an intermediate processing stage, such as in a personal computer so that the image data GD has a correct color reproduction determined based on the combination of the input device image data GD generating characteristics and the output device image data GD color reproduction characteristics. The output control information is equipment-type dependent information for the input device and output device. Information stored as output control information CI can include as image characteristic related information, for example, parameters related to gamma values or the target color space, and parameters relating to stored color correction such as shadow points, highlights, brightness, saturation, contrast, color balance adjustment, sharpness, and stored color correction, and as information relating to printer operation control, can include parameters relating to paper quality, resolution, and printer head operating direction (single direction printing or bi-directional printing).

The aforementioned image file GF of this working example is generated by, for example, a digital still camera (DSC), but a digital video camera (DVC), or input device such as a scanner (image file generating device) could be used as well.

The image file GF of this working example includes, at a minimum, the aforementioned image data area 101 and control information storage area 102, and can take file structures according to already standardized file formats. Below a case is explained when the image file GF of this working example is applied to a standardized file format.

Figure 2:
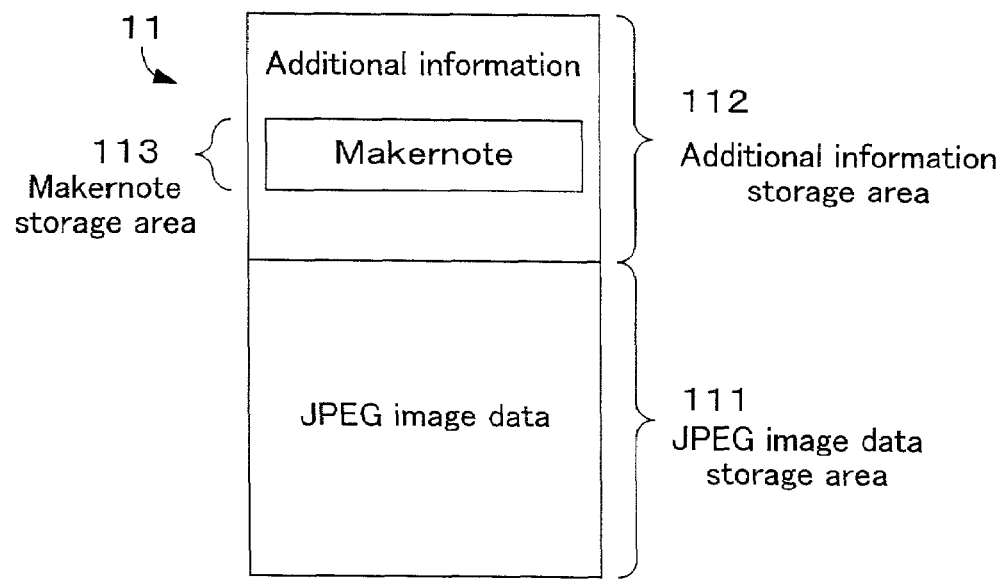
FIG. 2 is an explanatory diagram that schematically shows the image file GF of the first working example stored in an Exif file format.

The image file GF of this working example can have a file structure according to a digital still camera image file format standard ("Exif") for example. The Exif file specifications are determined by the Japan Electronics & Information Technology Industries Association (JEITA). Referring to FIG. 2, the schematic structure will be explained of a file interior when the image file GF of this working example has a file format according to this Exif file format. FIG. 2 is an explanatory diagram that schematically shows the image file GF of a working example stored in an Exif file format.

Image file 11, as an Exif file, includes JPEG image data storage area 111 that stores JPEG format image data, and additional information storage area 112 that stores various types of information relating to the stored JPEG image data. Stored in additional information storage area 112 is shooting time information relating to the JPEG image shooting conditions such as shooting date and time, exposure, and shutter speed, etc., and JPEG image thumbnail image data stored in JPEG image data storage area 11 is stored in TIFF format. Also, additional information storage area 112 has "Makernote" data storage area 113 which is an undefined area left open for DSC manufacturers, and the output control information CI of this working example is stored in Makernote data storage area 113. Also, as is known by those in the industry, with Exif format files, a tag is used to characterize each data, and Makernote is allocated as the tag name for data stored in Makernote data storage area 113, and this is called a Makernote tag.

Figure 3A:
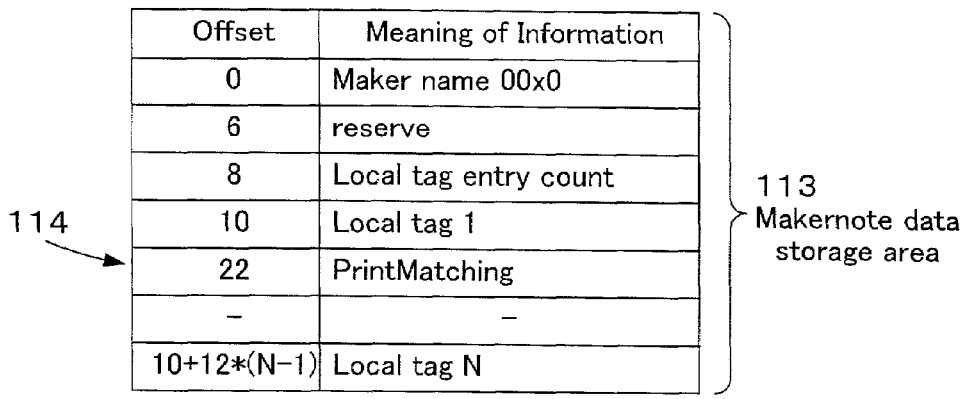
FIGS. 3a and 3b are explanatory diagrams that show the detailed hierarchical structure of an image file GF of the first working example.
Figure 3B:
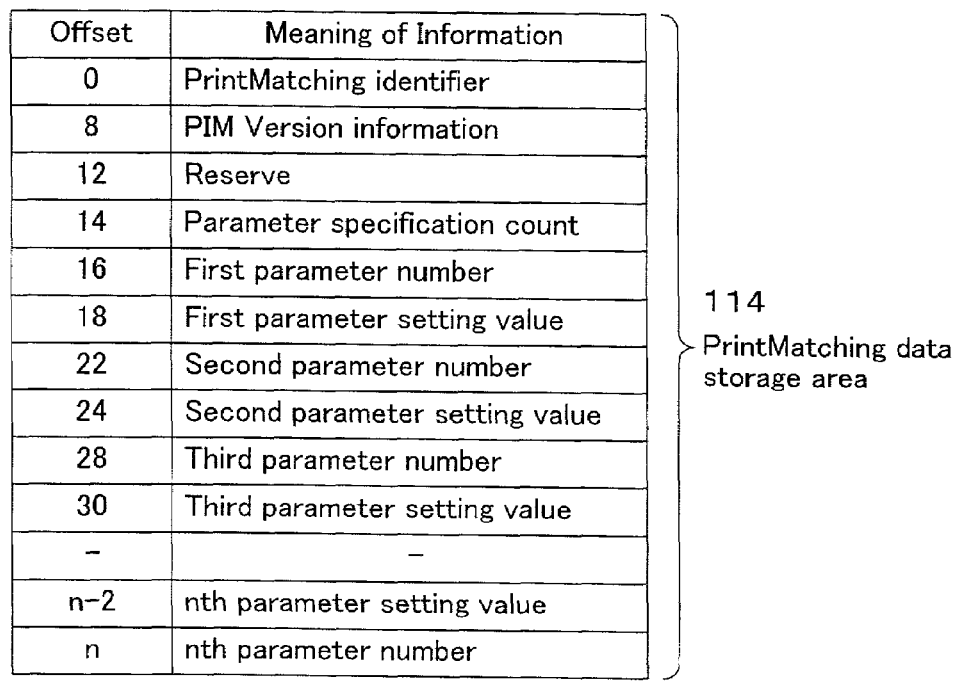

Referring now to FIGS. 3a and 3b, a detailed explanation of the data structure of Makernote data storage unit 113 is provided. FIGS. 3a and 3b are explanatory diagrams that show the detailed hierarchical structure of an image file GF of this working example. FIG. 3a shows the data structure of Makernote data storage area 113 (image output control data storage area), and FIG. 3b shows PrintMatching data storage area (image output control parameter storage area) 114 that is defined within Makernote data storage area 113.

The Makernote data storage area 113 of the image file GF of this working example also has a structure that allows it to identify stored data by tags, and the PrintMatching tag is allocated to output control information CI. Each tag of Makernote data storage area 113 is specified by a pointer with an offset value from the top address of Makernote data storage area 113. The information stored in Makernote data storage area 113 is the maker name in the top address (6 bytes), followed by the reserve area (2 bytes), the local tag entry count (2 bytes), and each local tag offset (12 bytes). After the maker name, a 00×0 end code that shows the end character string is attached.

The information stored in PrintMatching data storage area 114 is the PrintMatching identifier that shows a PrintMatching parameter is stored, a parameter specification count that shows the number of parameters specified, a parameter number in which is stored the value that specifies (identifies) the parameter number allocated in advance for each parameter, and the parameter setting value in which is stored parameter setting values of the specified parameter number. The parameter number can be, for example, information stored in a 2 byte area, and the parameter setting values can be information stored in a 4 byte area. As parameter numbers, for example, 1 can be allocated for the gamma value parameter, 7 can be allocated for the shadow point parameter, and 9 can be allocated for the contrast point parameter. As will be described later, on the output device side, it is possible to obtain the output control information CI (each parameter value) with this PrintMatching tag as an index.

As described above, the image file of this working example includes image data GD and output control information CI within one file, so it is possible to specify image output conditions such as gamma value, target color space, contrast, sharpness, and brightness to the output device with just one image file. Therefore, for example, by specifying the gamma value to an output device, it is possible to reduce the difference in brightness, contrast, etc. between the display image confirmed on a digital still camera monitor and the output image output using an output device such as a printer. DSC manufacturers are best suited to identify the optimal processing settings by observing the results of the DSC when used with a particular printer. This identification of what combination of DSC parameters and printer parameters is largely found through a trial and error process. Also, there can be multiple PrintMatching data to correspond to multiple output devices having different output characteristics.

Also, it is possible to specify the target color space. In the past, the de facto color space was fixed at sRGB, and so even when the digital still camera is capable of producing image data using color space that is broader than NTSC, sRGB, etc., the present inventors recognized that it is possible to effectively output broad color space and not lose the color information in downstream signal processing. Moreover, the present inventors recognized that it is desirable to output the image data in a color space that is larger than an SRGB color space, even if a SRGB transformation is performed in downstream processing since it is possible to do further color space processing to avoid losing the color information that would otherwise be lost in the SRGB transformation.

Furthermore, it is possible to specify the DSC operator's likes (image characteristics) such as sharpness and brightness as output control information during output, so it is possible to obtain the intended output results without need for separate photo retouching work. Also, there is no need to interpose a device for photo retouching, so this advantage is especially useful for output devices equipped with functions that can be processed with a single image file. Furthermore, it is possible to use a file to specify the printing processing conditions to the printer such as paper quality (paper type), resolution, and printing head operating direction which were set using the printer driver setting screen in the past, so it is possible to solve problems of insufficient settings of printing processing conditions that could not be resolved only by correction of printing data image quality characteristics. As a result, it is possible to print image data using printing processing conditions that are suitable for the image quality characteristics, so it is possible to achieve printing results that more accurately reflect the intention of the person who generated the image file. In this way, the DSC manufacturer goes through the laborious process of identifying the optimum combination of operational characteristics of a DSC-printer pair, and memorizes the characteristics in memory, for later retrieval when the photographer identifies the target printer to be used for printing. By following this approach, the DSC vendor does the matching once, so thousands of DSC photographers never have to do it, yet the photographers can be guaranteed that the results will be optimal for the DSC-printer pair.

B. Structure of an Image Data Output System that can Uses Image Files

Figure 4:
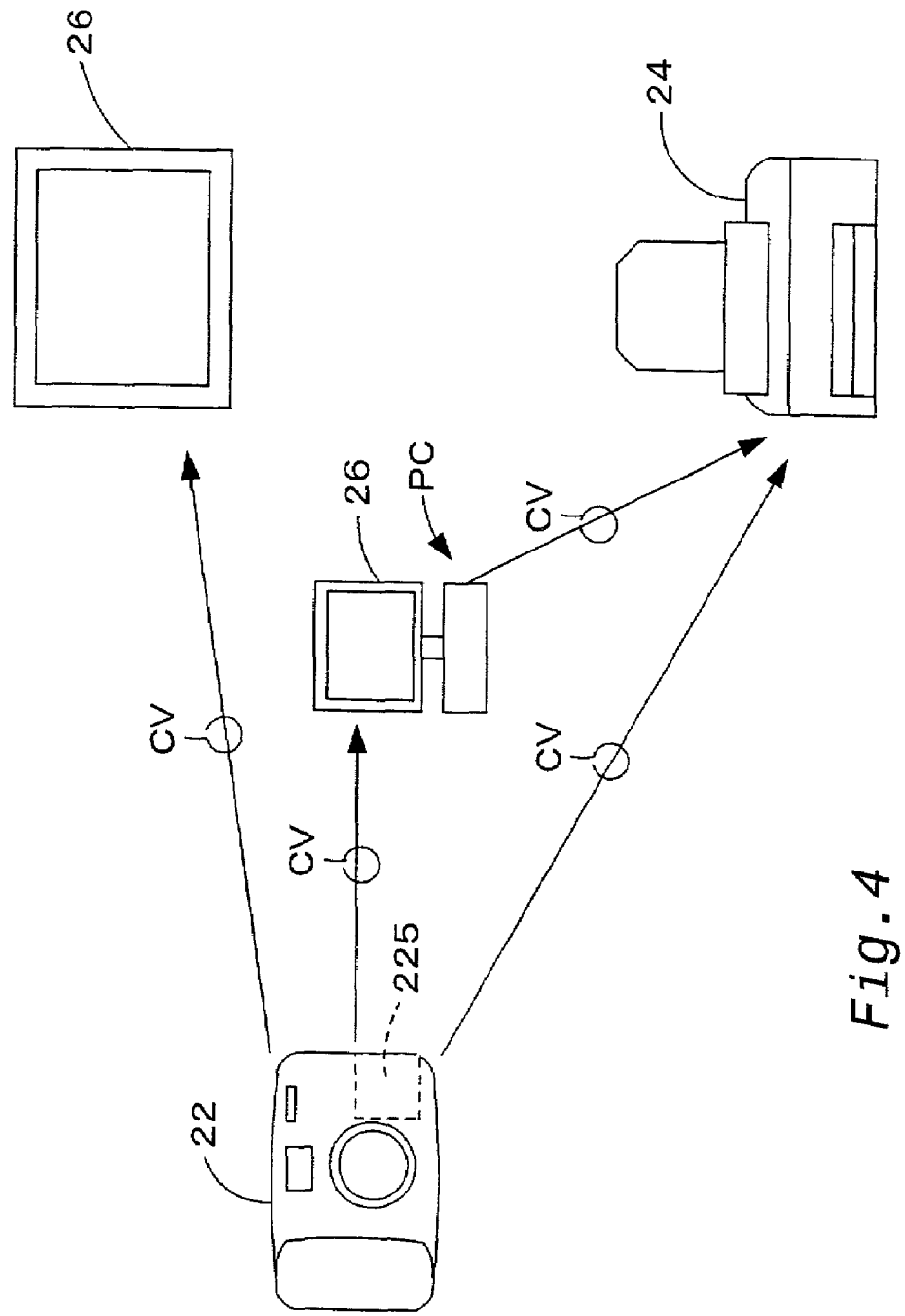
FIG. 4 is an explanatory diagram that shows an example of an image data output system that can use the image file GF of the first working example.
Figure 5:
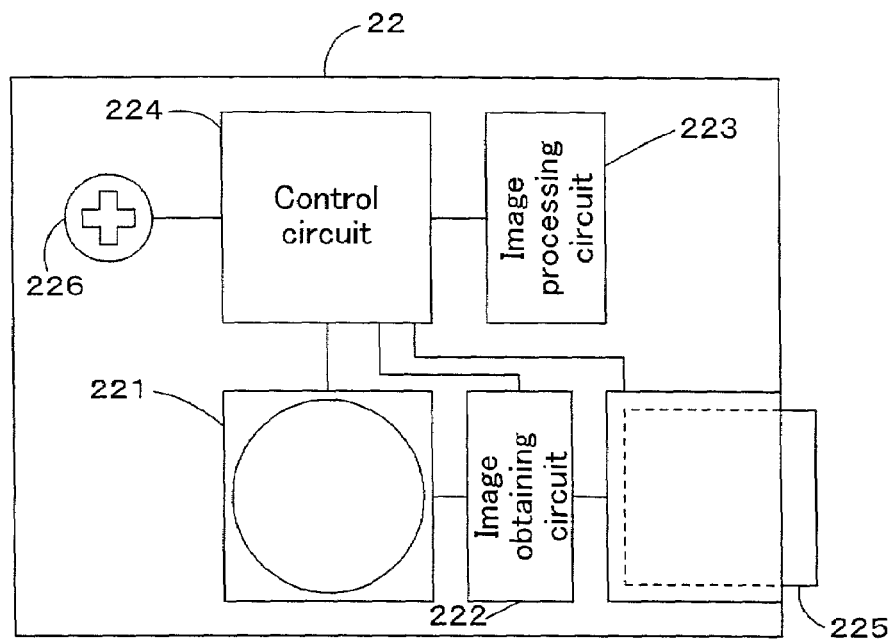
FIG. 5 is a block diagram that schematically shows a digital still camera that can generate an image file GF of the first working example.
Figure 6:
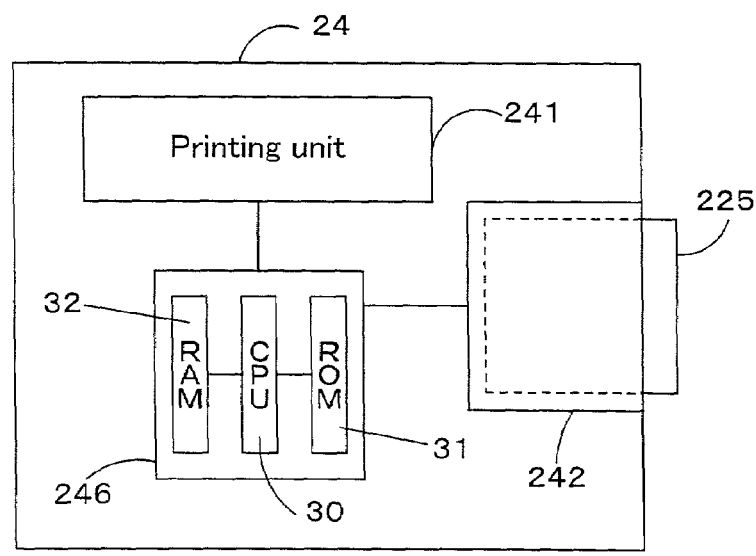
FIG. 6 is a block diagram that schematically shows a printer that can process an image file GF of the first working example.

FIGS. 4 through 6 will now be referred to while explaining the structure of an image data output system that can use the image file GF of this working example. FIG. 4 is an explanatory diagram that shows an example of an image data output system that can use the image file GF of the first working example. FIG. 5 is a block diagram that shows the schematic structure of a digital still camera that can generate an image file GF of the first working example. FIG. 6 is a block diagram that schematically shows a printer that can process an image file GF of the first working example.

Image data output system 20 includes a digital still camera 22 as an input device that generates image files GF, and printer 24 as an output device that outputs images based on image files GF generated by digital still camera 22. As an output device, besides the printer 24, it is also possible to use a monitor 25 such as a CRT display or LCD display, or to use a projector or the like, but in the explanation that follows, the printer 24 is used as the output device.

Digital still camera 22 is a camera that obtains images by forming images from light information in a digital device (CCD or photo multiplier), and as shown in FIG. 5, includes optical circuit 221 for gathering light information, image obtaining circuit 222 for controlling a digital device to obtain an image, image processing circuit 223 for processing the obtained digital images, and control circuit 224 for controlling each circuit. Digital still camera 22 saves the obtained images as digital data in storage device 225 which is shown to be optionally removable. The DSC 22 may also include an I/O port, such as a USB, IEEE 1394 port, or a wireless port, such as IR or RF, (e.g., Bluetooth compatible). When a "wired" communication channel is used, such a coaxial cable, for outputting the resulting image file, the propagated data signal sent over the channel as an electric signal. When transmitted over a wireless channel, the propagated data signal is sent as an electromagnetic signal. As a data structure format for saving the image data GD in digital still camera 22, a JPEG format is typical, but it is also possible to use other saving formats such as TIFF, GIF, BMP, and RAW. DSC 22 also includes select and determine button 226 for selecting and setting output control information CI.

In addition to image data GD, the DSC 22 used in this image data output system 20 stores output control information CI as an image file GF in storage device 225. Output control information CI can be automatically stored in storage device 225 as an image file GF together with image data GD when obtaining image data GD by setting in advance the output device planned for output or by setting in advance any output conditions on DSC 22 before shooting. Or, during shooting, once image data GD only is stored in storage device 225 as an image file GF, by specifying use of any desired output conditions or use of preset conditions on DSC 22 after shooting, it is also possible to add the specified output conditions to an image file GF as output control information CI.

Preset conditions can be, for example, output conditions to match the output device that outputs the image data GD in an image file GF, output conditions optimized for each manufacturer of printer 24 or for each equipment type of printer 24, or it can be general use output conditions that are used fairly often such as bright, sharp, etc. These preset conditions are held in memory within control circuit 224 of digital still camera 22 as information such as the gamma value, target color space contrast, and sharpness, etc. The present conditions may be identified by the DSC manufacturer and presented in an option menu to an operator of the DSC.

"Output conditions" means output conditions set by the user on digital still camera 22 (image processing circuit 223), and is information set as the user chooses such as the gamma value, target color space, contrast, and sharpness.

Image file GF generated by DSC 22 is sent to printer 24 via, for example, cable CV (e.g., USB or IEEE 1394) and computer PC, or via cable CV or by a wireless communications channel such as IR or RF (e.g., Bluetooth). An output signal containing the Exif image file with PIM parameter is sent in either an electric (wired channel) or an electromagnetic (wireless, optical channel). When the storage device 225 of DSC 22 is a detachable storage device, image file GF is sent to printer 24 via a personal computer (PC) to which the storage device 25 is connected, or by directly connecting storage device 225 to printer 24. With the explanation that follows, the explanation is based on a case when storage device 25 is detachable, and is connected directly to printer 24. Although the communication channels may be used as an alternative to the detachable storage device 25 for transferring the data image file from the DSC 22 to an output device, perhaps by way of an intermediate processing device.

Printer 24 can be an inkjet printer that forms an image by forming a dot pattern by spraying four colors of ink such as cyan (C), magenta (M), yellow (Y), and black (K) onto a printing medium, or it can be an electrophotographic printer that forms an image by transferring and fixing color toner onto a printing medium. As shown in FIG. 6, printer 24 includes printing unit 241 that executes print processing onto a printing medium including the printing head or rotating drum, etc., slot 242 that holds storage device 225, and control device 246 that analyzes output control information CI read from storage device 225 and controls the operation of each part of printer 24 based on the analyzed output control information. Control device 246 includes processing device (CPU) 30 that executes various arithmetic processes, read only memory (ROM) 31 that performs non-volatile storage of the programs, etc. executed by CPU 30, and random access memory (RAM) 32 that temporarily stores processing results of CPU 30 and obtained data. The detailed image processing flow executed by control device 246 will be described later.

C. Image Processing by a Digital Still Camera as a Second Working Example

Referring now to FIGS. 7 and 8, FIG. 7 is a flow chart that shows the image processing flow at digital still camera 22 according to a second working example. FIG. 8 is a table that shows an example of output control information CI parameters and parameter values set at digital still camera 22 for the second working example.

Control circuit 224 of digital still camera 22 decides whether preset control information is set by the user before taking a picture (step S100). As has already been explained, information that can be set as preset control information includes output conditions to match the output device that outputs the image data GD in an image file GF, output conditions optimized for each manufacturer of printer 24 or for each equipment type of printer 24, or it can be general use output conditions that are used fairly often, such as bright, sharp, etc. This information (conditions) is set by a user selecting from choices prepared in advance, and there is no requirement for the user to make fine settings.

When it is decided that preset control information is set (step S100: Yes), control circuit 224 generates image data GD (step S110) according to a shooting request, for example when the shutter button is pressed. Control circuit 224 stores the generated image data GD and the set preset control information as an image file GF in storage device 225 (step S120). The data generated at DSC 22 is expressed by the YCbCr color space.

In contrast to this, when it is decided that preset control information is not set (step S100: No), control circuit 224 generates image data GD according to the shooting request (step S130), and stores the generated image data GD as an image file GF in storage device 225 (step S140).

Control circuit 224 determines whether the specification of any image output condition after shooting has been executed (step S150). When it is determined that the specification of any image output condition after shooting has been executed (step S150: Yes), control circuit 224 adds the specified image output conditions to the image file GF stored in storage device 225 (step S160), and ends the main processing routine. Meanwhile, when it is determined that the specification of any image output condition after shooting has not been executed (step S150: No), control circuit 224 adds preset automatic adjustment conditions to the stored image file (step S170) and ends the main processing routine.

With the above processing executed at DSC 22, the output control information CI that specifies output conditions for printer 24 is provided together with image data GD to image file GF stored in storage device 225. As shown in FIG. 8, as conditions that can be specified as any image output condition, the value of each parameter is set. The meaning held by each parameter is known by those in the industry, so the following discussion will explain only the parameters that have a strong relationship with this working example.

The target color space (first information) is a parameter for matching the image on the shooting side and the image on the printer side by having the XYZ color space as a common color space between the shooting side and printing side, and defining the color range that was shot and submitting this to the printer side within this color space. The digital still camera shot image is normally print processed using the sRGB color space regardless of the color space held by the digital still camera. Therefore, even in a case when the digital still camera generates an image using a broader NTSC color space than the sRGB color space, the printing processing must be executed using the narrower color space, and in the past it was not possible to use the broad color space effectively. The parameters of the target color space in this working example specify the color space to be used by the printer during printing, so this problem is solved.

The sRGB negative value processing parameter (first information) is a parameter that specifies whether to handle negative values that appear among the RGB values or positive values that exceed 255 as valid data. When a value of 1 is taken for this parameter, negative values are handled as valid, and when a value of 0 is used, negative values are handled as invalid. Therefore, when this parameter is set to 1, image processing that uses negative RGB values (values other than in the 0 to 255 range) can be used at the printer to more accurately reproduce color. In many conventional systems the negative values are "clipped."

As described above, with a DSC 22 according to this working example, it is possible to generate the image file GF of this working example. Therefore, it is possible to use DSC 22 to preset image output conditions considering color reproduction characteristics of the output device, and to control the image output status at the output device. Especially when the color space that can be expressed by DSC 22 is broader than the sRGB color space typically used for image processing from the past, the image generated by DSC 22 was not output correctly at the output device, but by specifying the color space that DSC 22 has as the target color space, it is possible to make the color reproduction accurate. It is also possible to obtain output results that effectively use the color reproduction capability of DSC 22. Also, this working example used as an example a digital camera, but it also possible to apply this to an application program executed on a personal computer, palm-top computer, or other processor-based device that hosts application software. In this case, instead of generating image data GD, image data GD is obtained from a digital camera, and is stored together with the output control information CI generated by the application program in one image file GF.

D. Image Processing by a Printer as a Third Working Example

Figure 9:
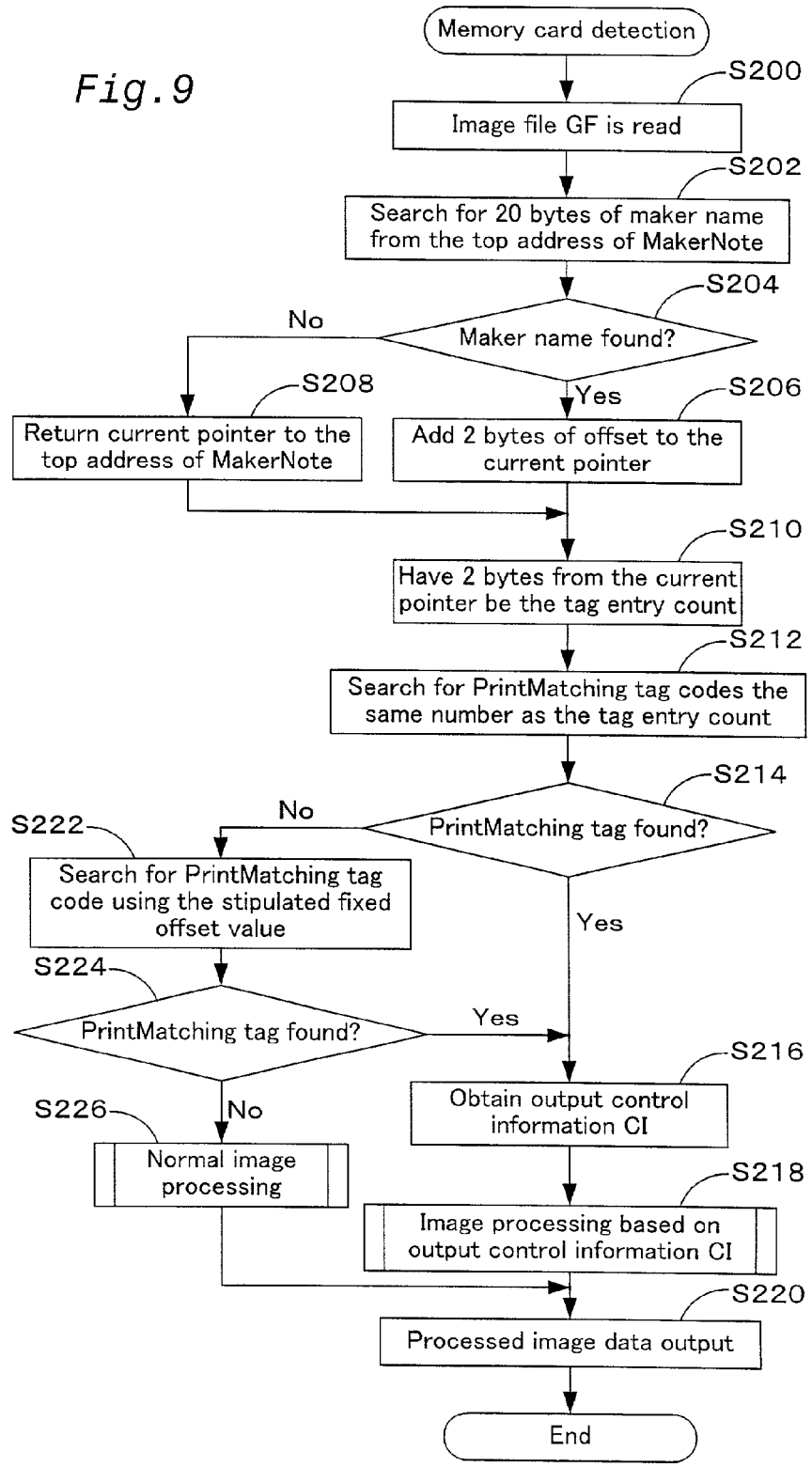
FIG. 9 is a flow chart that shows the flow of the processing routine of a print process of a printer according to a third working example.
Figure 10:
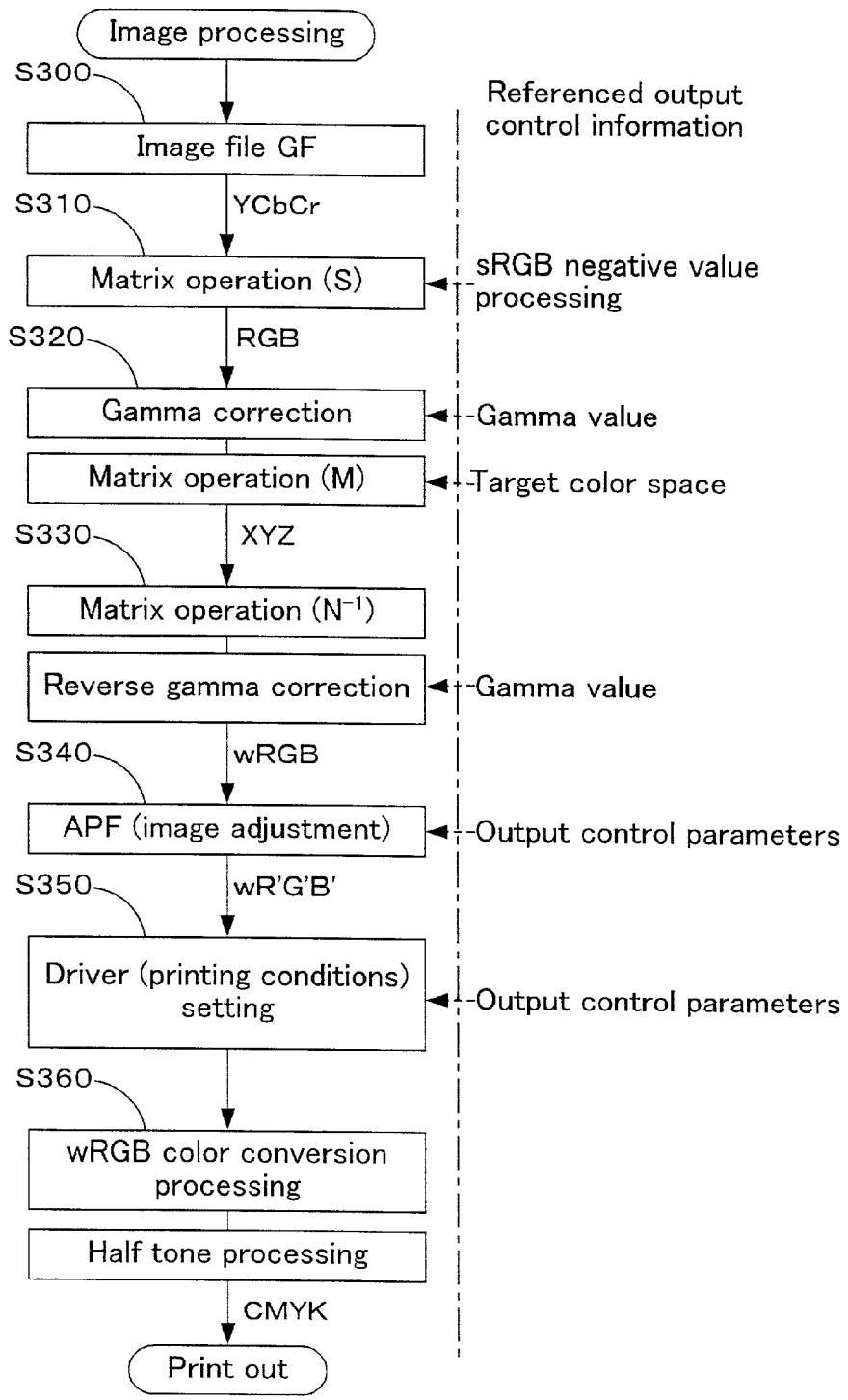
FIG. 10 is a flow chart that shows the flow of image processing of a printer according to a third working example.

FIG. 9 is a flow chart that shows the processing routine of a print process of printer 24 according to a third working example. FIG. 10 is a flow chart that shows the flow of image processing of printer 24.

When storage device (memory card) 225 is inserted into slot 247, control device 246 (CPU 30) of printer 24 reads image file GF from storage device 225, and temporarily stores the read image file GF in RAM 32 (step S200). CPU 30 searches (step S202) for the maker name (00×0 tag) of the read image file GF across 20 bytes from the top address of Makernote data storage area 113. The maker name is noted within 20 bytes from the top address within Makernote data storage area 113. When the maker note is found (step S204: Yes), CPU 30 adds 2 bytes of offset to the current pointer (step S206).

When CPU 30 could not find a maker name (step S204: No), it returns to the top address of the Makernote of the current pointer (step S208). This is to deal with cases when a maker name was never noted. In this case, a reserve area is allocated at the top address, so by returning the pointer to the top address, the pointer can be placed at the same position as when a maker name is found. CPU 30 interprets 2 bytes of information from the current pointer as the tag entry count to obtain a tag entry count (step S210). As already described, Makernote data storage area 113 stores 2 bytes of local tag entry count information sandwiched by 2 bytes of reserve area after the 6 byte maker name information, so CPU 30 can interpret as noted above.

CPU 30 searches for local tags by the same amount as the number of obtained tag entries (step S212), and decides whether or not there is a PrintMatching tag (step S214). When a PrintMatching tag is found (step S214: Yes), CPU 30 obtains the output control information CI stored in PrintMatching data storage area 114 and analyzes the control information, and then obtains the control parameter values (step S216). CPU 30 executes the image processing to be described later (step S218) based on the control parameter values obtained from the analyzed output control information CI, and prints out the processed image data (step S220).

When a PrintMatching tag is not found (step S214: No), CPU 30 re-searches the PrintMatching tag code using a stipulated fixed offset value (step S222). This is to deal with cases when there is an error in interpreting the local tag entry count. CPU 30 searches for PrintMatching tags again (step S224), and when a tag is found (step S224: Yes), the processes after step S216 that have already been described are executed. Meanwhile, when CPU 30 does not find a PrintMatching tag (step S224: No), printer 24 obtains the pre-held image processing information from ROM 31 and executes normal image processing (step S226). CPU 30 prints out the processed image data (step S220) and ends the main processing routine.

Referring now to FIG. 10, the printer's control device 246 (CPU 30) fetches image data GD from the read image-file GF (step S300). As was explained previously, DSC 22 saves the image data as a JPEG format file, and with JPEG files image data is saved using YCbCr color space to increase the compression rate.

CPU 30 executes 3×3 matrix operation S to convert image data based on the YCrCb color space to image data based on RGB color space (step S310). Matrix operation S is the operation expression shown FIG. 12. When executing this matrix operation S, CPU 30 references the sRGB negative value processing parameter from among the already described parameters, and when the sRGB negative value processing parameter value is set to 1, in other words, when the parameter is enabled, when RGB after conversion is a negative value, or even when it is a positive value other than the expressed color range of the sRGB color space (e.g. 256 or greater when there are 256 gradations), CPU 30 saves the obtained RGB value as is. Meanwhile, when the sRGB negative value processing parameter value is set to 0, in other words when it is disabled, when the RGB obtained after conversion has a negative value, CPU 30 saves the RGB value with the negative value as 0, and when it has a value 256 or greater, it saves it as 255. This later process "clips" the later data that is outside the sRGB range.

CPU 30 executes gamma correction and matrix operation M on the RGB color space image data obtained in this way (step S320). The process executed here is a process executed according to the control parameters within output control information CI. When executing gamma correction, CPU 30 references the digital still camera side gamma value among the previously described parameters, and executes gamma conversion processing on video data using the set gamma value. Matrix operation M is an operation for converting RGB color space to XYZ color space. When executing matrix operation M, to reflect the specified target color space, CPU 30 references the target color space of the already described parameters, and using a matrix (M) that corresponds to the set color space, NTSC for this working example, it executes the matrix operation. More specifically, it references the target color space tab, and by obtaining each matrix value of matrix (M), it executes a matrix operation using matrix (M). Matrix operation M is the operation expression shown in FIG. 13.

The color space of the image data GD obtained after executing matrix operation M is an XYZ color space. This is to attempt to match the color space expressed by image data GD and the color space on the printer side via the XYZ color space which is an absolute color space. In the past, the color space used when doing image processing on a printer or computer was fixed as sRGB, and it was not possible to effectively use the color space that DSC 22 has. In contrast to this, with this working example, output control information CI that specifies a target color space to the printer, etc. is given to image file GF, and a printer (printer driver) is used that changes the matrix (M) used for matrix operation M to correspond to the specified target color space. Therefore, it is possible to effectively use the color space that DSC 22 has, and to realize correct color reproduction.

To execute image adjustments based on other output control information, CPU 30 executes a process to convert the image data GD color space from an XYZ color space to a wRGB color space, specifically, it executes matrix operation $N^{-1}$ and reverse gamma correction (step S330). The wRGB color space is a broader color space than the sRGB color space. When executing gamma correction, CPU 30 references the printer side gamma value within the already described parameters, and executes reverse gamma conversion processing on video data using an inverse number of the set gamma value. When executing matrix operation $N^{-1}$, CPU 30 executes a matrix operation using a matrix $(N^{-1})$ corresponding to converting from ROM 31 to a wRGB color space Matrix operation $N^{-1}$ is the operation expression shown in FIG. 14.

The color space of the image data GD obtained after executing matrix operation $N^{-1}$ is a wRGB color space. As described previously, this wRGB color space is a broader color space than the sRGB color space, and corresponds to the color space that can be generated by DSC 22.

CPU 30 executes automatic image quality adjustment to characterize an image (step S340). The process executed here is also a process executed according to the control parameters within output control information CI. When executing automatic image quality adjustment, CPU 30 analyzes image data GD and obtains the characteristic parameter values that show the image quality of the image data GD. Then, CPU 30 references parameter values such as brightness and sharpness from among the control parameters, and corrects that standard parameter values set in advance in relation to each characteristic parameter based on the referenced control parameter values. CPU 30 corrects the characteristic parameter values so as to approach the corrected standard parameter values and executes image quality adjustment on video data. The values given to each parameter of the output control information CI for this working example are as shown in the table in FIG. 8. As control parameters, it is possible to have parameters formed from multiple control parameters while at the same time having different parameters for each scene for which the control parameter values are changed for each shot scene.

When performing automatic image quality adjustment, when correcting color balance, this can be done by, for example, obtaining the average value of each RGB component, correcting the obtained average values based on the control parameters, and obtaining the color skew of each component value in relation to the corrected average values to reflect them in the image data. Also, when correcting contrast, this can be done, for example, by obtaining the luminosity y for the pixels of the image data, and considering the control parameters, for the top and bottom edges, viewing the edge that entered inside by the amount of a specified distribution ratio as the luminosity distribution edge, and thus obtaining a parameter that corresponds to the expansion rate within a range for which luminosity reproduction is possible and parameter b that corresponds to the offset volume, and by using a relational equation for which Y=a y+b for the conversion destination luminosity Y in relation to conversion source luminosity y, contrast is corrected automatically.

CPU 30 references output control information CI, obtains the parameters relating to the type of printing medium (paper), resolution, and printing direction (one directional printing or bi-directional printing), for example, and sets the printing conditions for the printer driver (step S350). When the printing subject is a photograph, photographic paper is set as the paper, photo mode is set as the resolution, and bi-directional printing is set to off (in other words, one directional printing). In this way, the printer driver setting conditions are set based on output control information CI, so it is not necessary for the user who is executing the printing to set these conditions in the printer driver setting screen.

CPU 30 executes wRGB color conversion processing and half tone processing for printing (step S360). With wRGB color conversion processing, CPU 30 references the look up table (LUT) for conversion to the CMYK color space corresponding to the wRGB color space stored in ROM 31, and changes the image data color space from a wRGB color space to a CMYK color space. Specifically, the image data composed from the R, G, and B gradation values is converted to data of the six color gradation values of C, M, Y, K, LC, and LM, for example, that are used with printer 24. This conversion look up table includes one element that determines the color reproduction characteristics of color printer 20.

With half tone processing, color converted image data is received, and gradation count conversion processing is performed. For this working example, the image data after color conversion is expressed as data that has 256 gradation width for each color. In comparison to this, with printer 24 of this working example, it is only possible to achieve a state of either "form dots" or "do not form dots". Specifically, printer 24 can only express 2 gradations locally. Thus, image data that has 256 gradations is converted to image data that is expressed in 2 gradations that can be expressed by printer 24. As a representative method of this 2 gradation (binarization) processing, there is a method called the error diffusion method and a method called the systematic dither method.

At printer 24, before doing color conversion processing, when the image data resolution is lower than the printing resolution, linear interpolation is performed and new data is generated between adjacent image data, and when conversely it is higher than the printing resolution, by thinning out the data at a constant ratio, resolution conversion processing is executed that converts the image data resolution to the printing resolution. Also, printer 24 executes an interlace process that changes the sequence of image data that has been converted to the format that expresses whether dots are formed from the order it was to be transferred to color printer 20.

With this working example, all image processing is executed at printer 24, and a dot pattern is formed on a printing medium according to the generated image data, but all or part of the image processing can be executed on a computer as well. In this case, this is realized by giving the image processing functions explained with reference to FIG. 10 to the image data processing application installed in the hard disk, etc. of the computer. Image files GF generated by DSC 22 are provided to the computer via a cable or via storage device 225. On the computer, the application is started by an operation by the user, the image files GF are read, output control information CI is analyzed, and image data GD conversion and adjustment are executed. Or, this can also be done by detecting the insertion of storage device 225, or by detecting the insertion of a cable, starting the application automatically, reading the image files GF, analyzing output control information CI, converting image data GD, and making adjustments automatically.

As described above, with the image processing of the first working example on printer 24 according to this working example, the output control information CI within the image file GF, specifically the gamma value, gamma value for printer 24 according to the target color space, and the target color space which are control parameter values are set based on the combination of DSC 22 and color printer 24. Also, the concerned output control information CI is information that takes into consideration the color reproduction characteristics of printer 24. Therefore, it is possible to reduce or eliminate the differences between the image data reproduced at DSC 22 that generates image files GF and the image data reproduced at printer 24, and the image data can reproduce colors accurately. Also, by having an RGB-CMYK color conversion table that corresponds to the color space that can be expressed by the digital still camera, it is possible to more accurately output (print) the image data GD generated by the digital still camera.

Also, it is possible to specify parameters that show the intention of the image shooter such as sharpness and brightness to characterize the image as output control information CI, so when image file GF is generated, it is possible to realize the desired image preferences without doing photo retouching work.

Also, the printing conditions of printer 24 are set based on output control information CI, so it is not necessary for the user to set printing conditions such as type of printing medium, resolution, and printing direction on the printer driver setting screen. Also, there is no longer any risk of the user making unsuitable printing condition settings in the image data, so it is possible to prevent the decrease in printing quality due to unsuitable printing condition settings. Therefore, users can more reliably obtain the printing results intended by the person who generated the image file.

In any case, it is possible to specify printer output characteristics on the image file GF generating side, in other words on the digital still camera side, and it is possible to obtain the specified printing results, or the assumed printing results.

E. Image Processing by a Printer as a Fourth Working Example

Figure 11:
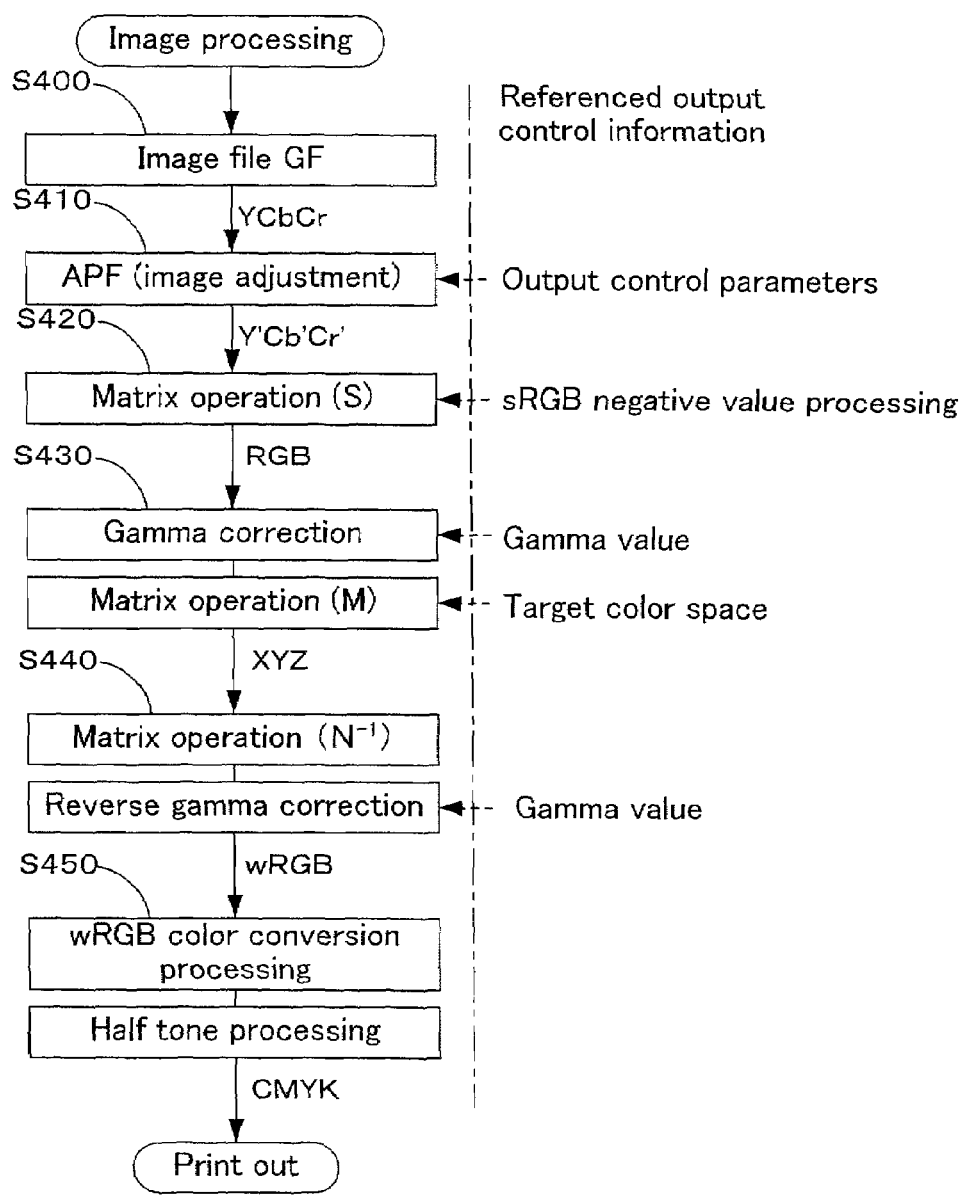
FIG. 11 is a flow chart that shows the image processing of a printer as a fourth working example.

Image processing at printer 24 can also be executed in the processing sequence shown in FIG. 11. Specifically, automatic image quality adjustment can be executed first. FIG. 11 is a flow chart that shows the image processing of a printer as a fourth working example. Except for the fact that the image processing procedure differs from that of the third working example, the hardware structure, etc. is the same as that of the third working example including the printer 24 hardware structure, etc., so the same code numbers were used and we are omitting an explanation of these here.

The printer's control device 246 (CPU 30) fetches image data GD from a read image file GF (step S400). DSC 22 saves the image data as a file in JPEG format as described previously, and with JPEG files image data is saved using YCbCr color space to increase the compression rate.

CPU 30 executes automatic image quality adjustment to characterize the image (step S410). When executing automatic image quality adjustment, CPU 30 analyzes image data GD and obtains the characteristic parameter values that show the image quality of the image data GD. Then, CPU 30 references parameter values such as brightness and sharpness from among the control parameters, and executes image adjustment on video data using the set parameter values (see FIG. 8 as an example). For automatic adjustment of an image, the standard parameter values are corrected based on the control parameter values, and correction of the image data GD characteristics parameter values is as described previously. Image data GD which reflects the image adjustment results are represented by the Y'Cb'Cr' color space.

CPU 30 executes 3×3 matrix operation S to convert Y'Cr'Cb' color space image data to RGB color space image data (step S420). Matrix operation S is the operation expression as previously described.

When executing this matrix operation S, CPU 30 references the sRGB negative value process parameters among the already described parameters, and executes processing according to the parameters.

CPU 30 executes gamma correction and matrix operation M on the RGB color space image data obtained in this way (step S430). The process executed here is a process executed according to the control parameters within output control information CI. When executing gamma correction, CPU 30 references the digital still camera side gamma value among the previously described parameters, and executes gamma conversion processing on video data using the set gamma value. When executing matrix operation M, CPU 30 references the target color space of the already described parameters, and using a matrix (M) that corresponds to the set color space, NTSC for this working example, it executes the matrix operation. Matrix operation M is the operation expression shown below.

The color space of the image data GD obtained after executing matrix operation M is an XYZ color space. To execute image adjustments based on other output control information, CPU 30 executes a process to convert the image data GD color space from an XYZ color space to a wRGB color space, specifically, it executes matrix operation $N^{-1}$ and reverse gamma correction (step S440). As has already been described, the wRGB color space is a broader color space than the RGB color space. Matrix operation $N^{-1}$ is the operation expression described previously.

The color space of the image data GD obtained after executing matrix operation $N^{-1}$ is a wRGB color space. As described previously, this wRGB color space is a broader color space than the sRGB color space, and corresponds to the color space that can be generated by DSC 22.

CPU 30 references output control information CI, obtains the parameters relating to the type of printing medium (paper), resolution, and printing direction (one directional printing or bi-directional printing), for example, and sets the printing conditions for the printer driver, and executes wRGB color conversion processing and half tone processing for printing (step S450). The wRGB color conversion processing and half tone processing are the same image processing as for the first working example, so we will omit an explanation of these here.

At printer 24, before doing color conversion processing, when the image data resolution is lower than the printing resolution, linear interpolation is performed and new data is generated between adjacent image data, and when conversely it is higher than the printing resolution, by thinning out the data at a constant ratio, resolution conversion processing is executed that converts the image data resolution to the printing resolution. Also, printer 24 executes an interlace process that changes the sequence of image data that has been converted to the format that expresses whether dots are formed from the order it was to be transferred to color printer 20.

For the image processing at printer 24 of the fourth working example as well, it is possible to obtain the same effects as those obtained for the image processing of the third working example.

F. Other Working Examples

For both the aforementioned third and fourth working examples of image processing, printer 24 was used as the output device, but it is also possible to use a display device such as a CRT, LCD, or projector as the output device. In this case, depending on the display device used as the output device, an image processing program (display driver) that executes image processing like that explained using FIGS. 9 and 10, for example, is executed. Or, when a CRT or the like is functioning as the display device of a computer, an image processing program is executed on the computer side. However, the finally output image data has an RGB color space rather than a CMYK color space.

In this case, as with being able to specify printing results via printer 24 using image file GF, it is possible to specify display results for the display device such as a CRT using image file GF. Therefore, by giving suitable parameters for the display device such as a CRT to output control information CI of the image file GF, and by giving the optimal parameters to the display characteristics of each display device, it is possible to more accurately display image data GD generated by DSC 22.

Also, with each of the aforementioned working examples, we explained an example with output control information (PrintMatching data) stored in one output device within an image file, but it is also possible to store output control information for multiple output devices with different output characteristics in an image file GF. In this case, by providing a function that identifies and obtains PrintMatching data specified itself by each output device from one image file GF, it is possible to execute image processing and image output control of image data GD based on the obtained PrintMatching data. Therefore, it is possible to control suitable image output status for multiple output formats.

Above, image files, image file generating devices, and output devices that can use image files that relate to the present invention were explained based on working examples, but the preferred embodiments of the invention noted above are for making the present invention easy to understand, and do not limit the present invention. The present invention can of course be changed and improved without straying from the gist and claims of the invention, and it goes without saying that the present invention also includes equivalent items.

With the aforementioned working examples, the parameters of gamma value, target color space, and sharpness sere used as the output control information CI, but what kind of parameter is used for output control information can be decided freely.

Also, each parameter value shown as an example in the table in FIG. 8 is nothing more than an example, and the invention of this application is not limited by these values Furthermore, the values for matrices S, M, and $N^{-1}$ for each expression are nothing more than examples, and it goes without saying that it is possible to make suitable modifications by the targeted color space or the color space that can be used at printer 24, etc.

With the aforementioned working examples, a case was also explained using a DSC 22 as the image file generating device, but besides this it is also possible to use a scanner or a digital video camera, etc. When using a scanner, the specification of the output control information of image file GF can be executed on a computer PC, or a preset button with preset information allocated to them or display screen and setting buttons to make any desired settings can be provided on the scanner for setting information, so that execution can be performed from the scanner alone.

The color spaces used in the aforementioned working examples are nothing more than examples, and other color spaces can also be used. In any of these cases, what is required is that the image file generated on the image file generating device side be able to obtain the assumed output results or the specified output results at the output device side.

With the aforementioned first working example, an example was explained of an Exif format file as a specific example of an image file GF, but the format of the image file of the present invention is not limited to this. Specifically, it is acceptable if the image file includes the image data that is to be output by the output device and the output control information CI that specifies image data output conditions (image quality adjustment parameters) for the output device. This is because with this kind of file, it is possible to reduce the differences in output images between the image data generated at the image file generating device (image display obtained via a monitor, etc.) and the output image at the output device. Also, simply by sending the image file to the output device side, it is possible to apply any characteristics for output images at the output device.

Also, included in image files GF that include image data and output device control information CI are files that can generate relational data related to output device control information CI, can store image data and output device control information CI in independent files, and reference relational data when doing image processing and correlate image data and output device control information CI. In this case, though image data and output device control information CI are stored in separate files, at the point that image processing is done using the output device control information CI, image data and output device control information CI are in a relationship for which they can not be united, and this is because this is functioning essentially in the same way as when they are stored in the scene file. Specifically, at least at the point of image processing, the embodiment used with image data and output device control information CI correlated is included in the image file of this working example.

The DSC 22 and printer 24 used for the aforementioned second and third working examples are nothing more than examples, and the structures of these examples are not limited by the noted contents of each working example. For DSC 22, it is acceptable as long as there is at least a function that can generate an image file GF of the first working example. Also for printer 24, it is acceptable as long as the output control information CI of the image file GF of the first working example is analyzed and an image is output (printed) according to the specified image output conditions.

Image files GF that contain image data and output device control information CI include files created by generating association data associated with the output device control information CI, storing the image data and output device control information CI in separate files so as to enable the image data and output device control information CI to be associated by referring to the association data during image processing. While in this case image data and output device control information CI are stored in separate files, during image processing using the output device control information CI, the image data and output device control information CI are indivisibly united, so functioning is substantially the same as with storage in a single file. Associated image data and output device control information CI are at least during image processing, is included in image file GF in the present embodiment. Motion video files stored on optical media such as CD-ROM, CD-R, DVD-ROM and DVD-RAM are also included.

In the preceding embodiments, a digital still camera is used to generate image files, but a digital video camera could be used as well. Files generated by digital video cameras take the form of image files containing static image data and output control information, or motion video files containing motion video data (e.g. in MPEG format) and output control information. Where motion video files are used, some or all of the frames of the video are subjected to output control with reference to the output control information.

Obviously, numerous modifications and variations of the present invention are possible in light of the above teachings. For example features described for certain embodiments may be combined with other embodiments described herein. It is therefore to be understood that within the scope of the appended claims, the invention may be practiced otherwise than as specifically described herein.

This document is based on, and claims priority to, the following four Japanese Applications, the entire contents of each of which being incorporated herein by reference: Japanese application No. 2000-265794, filed Sep. 1, 2000; Japanese application No. 2001-34518, filed Feb. 9, 2001; Japanese application No. 2001-74696, filed Mar. 15, 2001; and Japanese application No. 2001-217878, filed Jul. 18, 2001.

What is claimed is:

1. An image data generating apparatus comprising:
an image data generating mechanism configured to generate image data;
an image process control information obtaining mechanism configured to obtain image process control information that designates image process conditions for the generated image data at an output apparatus, wherein the image process control information is preliminarily determined according to a combination of an image generating characteristic of said image data generating apparatus and reproduction characteristics of the output apparatus;
an output mechanism configured to output the generated image data associated with the obtained image process control information; and
a storage mechanism that is configured to hold therein the image process control information,
wherein said image process control information obtaining mechanism is configured to obtain said image process control information from said storage mechanism.

2. The image data generating apparatus of claim 1, wherein:
the image process control information and the generated image data are contained in one output file.

3. The image data generating apparatus of claim 2, wherein:
said output file is an Exif file.

4. The image data generating apparatus of claim 3, wherein:
the image process control information is stored at a Makernote portion of the Exif file.

5. The image data generating apparatus of claim 1, wherein:
the image process control information contains information for controlling the reproduction characteristics of the image data output apparatus.

6. The image data generating apparatus of claim 5, wherein:
the image process control information includes gamma correction information.

7. The image data generating apparatus of claim 6, wherein:
said image process control information further comprises additional information that is correlated to said image data, said additional information including at least one of color space information, contrast information, color balance information, sharpness information, color correction information, shadow point information, highlight point information, brightness correction information, and highlight color information.

8. The image data generating apparatus of claim 1, further comprising:
an optional image process condition obtaining mechanism configured to obtain an optional image process condition set by user;
an image control information adding mechanism configured to add the obtained optional image process condition to the image process control information; and
wherein the image process control information obtaining mechanism obtains the image process control information to which the optional image process condition is added.

9. The image data generating apparatus of claim 1, further comprising:
a data transfer mechanism configured to transmit the image data and the image process control information.

10. The image data generating apparatus of claim 1, wherein:
the image data generating apparatus is at least one of a digital still camera, a digital video camera, and a scanning device.

11. An image data generating apparatus comprising:
an image data generating mechanism configured to generate image data of a subject;
a first obtaining mechanism configured to obtain first information preliminarily prepared to reflect image generating characteristics of the image data generating mechanism, the first information being used in color conversion to an absolute color space;
a second obtaining mechanism configured to obtain second information preliminarily prepared to reflect reproduction characteristics of an output apparatus that outputs an image according to image data that is input from the image data generating mechanism, the second information designates an optional image quality adjustment process to image data that is output to the output apparatus; and
an output mechanism configured to output the generated image data associated with image process control information including at least one of the first information and the second information.

12. The image data generating apparatus of claim 11, wherein:
the image data, the first information and the second information are contained in one image file.

13. The image data generating apparatus of claim 11, wherein:
the first information includes at least one of gamma correction information, color space information, and negative image data value information.

14. The image data generating apparatus of claim 11, wherein:
the second information includes at least one of an image correction characteristic associated with generating a print data from an image data.

15. The image data generating apparatus of claim 14, wherein:
the second information includes at least one of contrast information, color balance information, sharpness information, stored color correction information, shadow point information, highlight point information, saturation information, and brightness correction information.

16. The image data generating apparatus of claim 11, wherein:
the image data generating apparatus is at least one of a digital still camera, a digital video camera, and a scanning device.

17. An image data generating apparatus, comprising:
means for generating image data;
means for obtaining image process control information that designates image process conditions for the generated image data at an output apparatus, wherein the image process control information is preliminarily determined according to a combination of an image generating characteristic of said means for generating image data and reproduction characteristics of the output apparatus; and
means for generating an output containing the generated image data and the image process control information.

18. The image data generating apparatus of claim 17, wherein:
each of said means for generating image data, means for obtaining image process control information, and means for generating an output is a computer program product having computer readable instructions.

19. The image data generating apparatus of claim 18, wherein:
the image process control information and the generated image data are contained in one output file.

20. The image data generating apparatus of claim 17, wherein:
the image process control information includes gamma correction information.

21. An image data generating apparatus comprising:
means for generating image data of a subject;
means for obtaining first information preliminarily prepared to reflect image generating characteristics of the means for generating image data, the first information being used in color conversion to an absolute color space;
means for obtaining second information preliminarily prepared to reflect reproduction characteristics of an output apparatus that outputs an image according to image data that is input from the means for generating image data, the second information designates an optional image quality adjustment process to image data that is output to the output apparatus; and
means for outputting the generated image data associated with image process control information including at least one of the first information and the second information.

22. The image data generating apparatus of claim 21, wherein:
said means for outputting the generated image data includes means for including the image data, the first information and the second information in one output file.

23. The image data generating apparatus of claim 21, wherein:
the first information includes at least one of gamma correction formation, color space information, and negative image data value information.

24. The image data generating apparatus of claim 21, wherein:
the second information includes at least one of contrast information, color balance information, sharpness information, stored color correction information, shadow point information, highlight point information, saturation information, and brightness correction information.

25. A method for generating an image data, comprising steps of:
generating image data;
obtaining image process control information that designates image process conditions for the generated image data at an output apparatus, wherein the image process control information is preliminarily determined according to a combination of an image generating characteristic of an image data generating apparatus and reproduction characteristics of the output apparatus; and
generating an output containing the generated image data associated with the obtained image process control information.

26. The method of claim 25, wherein:
said steps of generating image data, obtaining image process control information, and generating an output are computer-implemented process steps.

27. The method of claim 26, further comprising a step of:
including said image process control information and said image data in one output file.

28. The method of claim 25, wherein:
the image process control information includes gamma correction information.

29. A method for generating an image data, comprising steps of:
generating image data of a subject;
obtaining first information preliminarily prepared to reflect image generating characteristics of an image data generating apparatus, the first information being used in color conversion to an absolute color space;
obtaining second information preliminarily prepared to reflect reproduction characteristics of an output apparatus that outputs an image, according to image data that is input from the image data generating apparatus, the second information designates an optional image quality adjustment process to image data that is output to the output apparatus; and
generating an output containing the generated image data associated with image process control information including at least one of the first information and the second information.

30. The method of claim 29, wherein:
said step of generating an output includes including the image data, the first information and the second information in one output file.

31. The method of claim 29, wherein:
the first information includes at least one of gamma correction information, color space information, and negative image data value information.

32. The method of claim 29, wherein:
the second information includes at least one of contrast information, color balance information, sharpness information, stored color correction information, shadow point information, highlight point information, saturation information, and brightness correction information.

33. An image processing apparatus configured to perform image processing on image data, comprising:
a processor;
a data retrieval mechanism configured to retrieve said image data and image process control data associated with the image data from an image data generating apparatus, wherein
the image process control data contains image process control information that designates image process conditions for the retrieved image data at an output apparatus, wherein the image process control information is preliminarily determined according to a combination of an image generating characteristic of said image data generating apparatus and reproduction characteristics of the output apparatus; and
a data providing mechanism configured to provide the image data and the image process control data to the processor; and wherein
said processor is configured to perform image processing on said image data using the image data and the image process control information.

34. The image processing apparatus of claim 33, wherein:
if the process control data is not retrieved, the data providing mechanism provides the image data and a predetermined image process control data to the processor, and wherein the predetermined image process control data is configured to general purpose image processing.

35. The image processing apparatus of claim 33, wherein:
said processor is hosted in a computer.

36. The image processing apparatus of claim 33, wherein the output apparatus is a printer.

37. The image processing apparatus of claim 33, wherein:
said image process control data and said image data are contained in a single image file.

38. The image processing apparatus of claim 37, wherein:
the image process control data is stored at a Makernote portion of the Exif file, and
the data retrieval mechanism retrieves the Makernote portion to obtain the image process control data.

39. The image processing apparatus of claim 37, wherein:
the image process control information contains information for controlling the reproduction characteristics of the image data at the output apparatus.

40. The image processing apparatus of claim 39, wherein:
the image process control information includes gamma correction information.

41. The image processing apparatus of claim 40, wherein:
said image process control information further comprises additional information that is correlated to said image data, said additional information including at least one of color space information, contrast information, color balance information, sharpness information, color correction information, shadow point information, highlight point information, brightness correction information, and highlight color information.

42. An image processing apparatus configured to perform image processing on image data of a subject, said image data retrieved from an image file, comprising:
a processor;
a data retrieval mechanism configured to retrieve said image file from an image data generating apparatus and provide the image file to the processor, said image file including
first information preliminarily prepared to reflect image generating characteristics of said image data generating apparatus, the first information being used in color conversion to an absolute color space;
second information preliminarily prepared to reflect reproduction characteristics of an output apparatus that outputs an image according to image data that is input from said image data generating apparatus, the second information designates an optional image quality adjustment process to image data that is output to the output apparatus; wherein
said processor is configured to implement
a first reproduction mechanism configured to perform image processing on said image data with said first information, and a second reproduction mechanism configured to perform a reproduction process specified for said image data based on said second information; and an image data output mechanism configured to output the image data after said image data has been processed by said first reproduction mechanism and said second reproduction mechanism.

43. The image processing apparatus of claim 42, wherein: the first information includes at least one of gamma correction information, color space information, and negative image data value information.

44. The image processing apparatus of claim 42, wherein: the second information includes at least one of an image correction characteristic associated with generating a print data from an image data.

45. The image processing apparatus of claim 44, wherein: the second information includes at least one of contrast information, color balance information, sharpness information, stored color correction information, shadow point information, highlight point information, saturation information, and brightness correction information.

46. The image processing apparatus of claim 42, wherein: said image processing apparatus includes a printer.

47. An image processing apparatus configured to perform image processing on image data retrieved from an image file, comprising:

a processor; and means for retrieving said image file from an image data generating apparatus and providing the image file to the processor, said image file including the image data, and image process control data containing image process control information that designates image process conditions for the retrieved image data at an output apparatus, wherein the image process control information is preliminarily determined according to a combination of an image generating characteristic of said image data generating apparatus and reproduction characteristics of the output apparatus, wherein said processor includes means for processing said image data using the image data and the image process control information.

48. The image processing apparatus of claim 47, wherein: the image file includes said image process control data and said image data in a single file.

49. The image processing apparatus of claim 48, wherein: the image process control information includes gamma correction information.

50. An image processing apparatus configured to perform image processing on image data of a subject, said image data retrieved from an image file, comprising:

a processor; and means for retrieving said image file from an image data generating apparatus and providing the image file to the processor, said image file including first information preliminarily prepared to reflect image generating characteristics of an image data generating apparatus, the first information being used in color conversion to an absolute color space;

second information preliminarily prepared to reflect reproduction characteristics of an output apparatus that outputs an image according to image data that is input from said image data generating apparatus, the second information designates an optional image quality adjustment process to image data that is output to the output apparatus, wherein said processor is configured to implement means for performing image processing on said image data with said first information, and means for performing a reproduction process specified for said image data based on said second information; and means for outputting the image data after said image data has been processed by said means for performing image processing and said means for performing a reproduction process.

51. The image processing apparatus of claim 50, wherein: the first information includes at least one of gamma correction information, color space information, and negative image data value information.

52. A method for processing image data, comprising steps of:

retrieving said image data and image process control information from an image data generating apparatus;

providing the image data and the image process control information to the processor, wherein the image process control information designates image process conditions for the retrieved image data at an output apparatus, and wherein the image process control information is preliminarily determined according to a combination of an image generating characteristic of said image generating apparatus and reproduction characteristics of the output apparatus; and processing said image data using the image data and the image process control information.

53. The method of claim 52, wherein: said image process control information and said image data are included in a single image file.

54. The method of claim 52, wherein: the processing step includes processing of the image data at the output apparatus.

55. The method of claim 54, wherein: the image process control information includes gamma correction information.

56. A computer program product, comprising:

a computer storage medium; and a computer program code stored in the computer storage medium for implementing an image processing on a computer, the computer program code having a first computer code configured to retrieve image data and image process control data associated with the image data from an image data generating apparatus, wherein the image process control data contains image process control information that designates image process conditions for the image data at an output apparatus, and wherein the image process control information is preliminarily determined according to a combination of an image generating characteristic of said image data generating apparatus and reproduction characteristics of the output apparatus, a second computer code configured to perform image processing on the image data using the image data and the image process control information, if the image process control data is retrieved.

57. A computer program product of claim 56, further comprising:

a third computer code configured to perform image data processing on the image data using a predetermined image process control data, if the image process control data is not retrieved, and wherein the predetermined image process control data is configured to general purpose image processing.

58. An image data processing system, comprising:
an image data generating device configured to generate image data;
an image process control information obtaining mechanism configured to obtain image process control information that designates image process conditions for the generated image data at an output apparatus, wherein the image process control information is preliminarily determined according to a combination of an image generating characteristic of said image data generating device and reproduction characteristics of the output apparatus;
an output mechanism configured to output the generated image data associated with the obtained image process control information in an output file;
a processor; and
a data retrieval mechanism configured to retrieve said output file and provide the output file to the processor, wherein
said processor is configured to perform image processing on said image data using the image data and the image process control information.

59. The system of claim 58, further comprising:
a personal computer that contains said processor and said data retrieval mechanism.

60. An image data processing system, comprising:
an image data generating apparatus, including
  an image data generating mechanism configured to generate image data of a subject and store said image data in an image file,
  a first image obtaining mechanism configured to obtain first information preliminarily prepared to reflect image generating characteristics of the image data generating apparatus, the first information being used in color conversion to an absolute color space,
  a second image obtaining mechanism configured to obtain second information preliminarily prepared to reflect reproduction characteristics of an output apparatus that outputs an image according to image data that is input from the image data generating apparatus, the second information designates an optional image quality adjustment process to image data that is output to the output apparatus; and
an image processing apparatus, including
  a processor,
  a data retrieval mechanism configured to retrieve said generated image data, said first information, and second information and provide said generated image data, said first information and said second information to the processor, wherein
said processor is configured to implement
  a first reproduction mechanism configured to perform image processing on said image data with said first information, and
  a second reproduction mechanism configured to perform a reproduction process specified for said image data based on said second information, and
an image data output mechanism configured to output the image data after said image data has been processed by said first reproduction mechanism and said second reproduction mechanism.

61. An image data processing system, comprising:
means for generating image data;
means for obtaining image process control information that designates image process conditions for the generated image data at an output apparatus, wherein the image process control information is preliminarily determined according to a combination of an image generating characteristic of said means for generating image data and reproduction characteristics of the output apparatus;
means for generating an image file with image process control data containing the image process control information;
a processor; and
means for retrieving said image file and providing the image file to the processor, said image file including
  the image data, and
  the image process control data, wherein
said processor includes means for processing said image data using the image process control information.

62. An image data processing system, comprising:
means for generating an image file, including,
  means for generating image data of a subject,
  means for obtaining first information preliminarily prepared to reflect image generating characteristics of the means for generating image data, the first information being used in color conversion to an absolute color space,
  means for obtaining second information preliminarily prepared to reflect reproduction characteristics of an output apparatus that outputs an image according to image data that is input from the means for generating image data, the second information designates an optional image quality adjustment process to image data that is output to the output apparatus, and
  means for generating the image file containing the image data and at least one of the first information and the second information; and
an image processing apparatus including,
  a processor, and
  means for retrieving said image file and providing said image file to the processor, said image file including
    the image data, the first information and the second information, wherein
said processor includes means for processing said image data using the first information and the second information.

63. An image data generating apparatus comprising:
an image data generating module configured to generate image data of a subject by photoelectric converter;
a storage module configured to store image process control information that is preliminarily determined according to an output result of the generated image data at an output apparatus, the image process control information designating an image processing condition for image data that is output to the output apparatus;
an image process control information obtaining module configured to obtain the image process control information from the storage module; and
an output module configured to output the generated image data associated with the obtained image process control information.

64. An image data generating apparatus according to claim 63, wherein the image generating apparatus includes a digital still camera.

65. A digital still camera comprising:

an image data generating module that generates image data;

an image process control information obtaining module that obtains image process control information, wherein the image process control module is preliminarily determined according to a combination of image generating characteristics of the digital still camera and reproducing characteristics of an output apparatus, wherein the image process control information designates an image processing condition for image data that is output to the output apparatus; and an output module that outputs the generated image data associated with the obtained image process control information.

* * * * *